(12) United States Patent
Sakata et al.

(10) Patent No.: US 8,148,886 B2
(45) Date of Patent: Apr. 3, 2012

(54) RED NITRIDE PHOSPHOR AND PRODUCTION METHOD THEREOF

(75) Inventors: Shin-ichi Sakata, Ube (JP); Takeshi Yamao, Ube (JP); Tetsuo Yamada, Ube (JP)

(73) Assignee: Ube Industries, Ltd. (JP)

( * ) Notice: Subject to any disclaimer, the term of this patent is extended or adjusted under 35 U.S.C. 154(b) by 454 days.

(21) Appl. No.: 11/795,298

(22) PCT Filed: Jan. 25, 2006

(86) PCT No.: PCT/JP2006/301595
§ 371 (c)(1),
(2), (4) Date: Jul. 13, 2007

(87) PCT Pub. No.: WO2006/080535
PCT Pub. Date: Aug. 3, 2006

(65) Prior Publication Data
US 2008/0128726 A1 Jun. 5, 2008

(30) Foreign Application Priority Data
Jan. 31, 2005 (JP) ................................. 2005-022869

(51) Int. Cl.
*C09K 11/59* (2006.01)
*C09K 11/08* (2006.01)
(52) U.S. Cl. .................................. 313/486; 252/301.4 F
(58) Field of Classification Search .................. 313/486; 252/301.4 F
See application file for complete search history.

(56) References Cited

U.S. PATENT DOCUMENTS
5,998,925 A 12/1999 Shimizu et al.
2005/0012075 A1* 1/2005 Sakata et al. ............. 252/301.4 F
2006/0033083 A1* 2/2006 Sakane et al. ............ 252/301.4 F FOREIGN PATENT DOCUMENTS
EP 1 609 839 A2 12/2005
(Continued)

OTHER PUBLICATIONS

Naonori Hirosaki< "Akairo Chisso Keikotai ($CaAlSiN_3:Eu^{2+}$) no Gosei to Kessho Kozo", 2004 Nen Shuki Dai 65 Kai Extended abstracts, the Japan Society of Applied Physics, Dai 3 Bunsatsu, Sep. 1, 2004, p. 1283.

(Continued)

*Primary Examiner* — Joseph L Williams
*Assistant Examiner* — Nathaniel Lee
(74) *Attorney, Agent, or Firm* — DLA Piper LLP (US)

(57) ABSTRACT

A red phosphor where the crystal phase constituting the phosphor is monoclinic Eu-activated $CaAlSiN_3$. A red phosphor which is Eu-activated $CaAlSiN_3$ powder having an average particle diameter of 10 μm or less as measured in the non-pulverized state by the laser scattering particle size distribution analysis. A light-emitting device comprising a blue light-emitting element, a yellow phosphor capable of converting the blue light emitted from the blue light-emitting element into yellow light, and the above-described red phosphor capable of converting the blue light emitted from the blue light-emitting element into red light. A method for producing Eu-activated $CaAlSiN_3$, comprising firing a raw material powder comprising $Ca_3N_2$, AlN, $Si_3N_4$ and EuN at 1,400 to 2,000° C. in a nitrogen-containing atmosphere, the $Ca_3N_2$, AlN and $Si_3N_4$ giving a composition falling in the region surrounded by a straight line connecting the following four points A to D in the composition diagram of FIG. 1, and EuN being contained in an amount of 0.01 to 10 parts by weight as Eu per 100 parts by weight in total of $Ca_3N_2$, AlN and $Si_3N_4$.

13 Claims, 24 Drawing Sheets

FOREIGN PATENT DOCUMENTS

| | | | |
|---|---|---|---|
| EP | 1 696 016 A1 | | 8/2006 |
| EP | 1696016 A1 | * | 8/2006 |
| JP | 2000-208815 A | | 7/2000 |
| JP | 2005-336253 | | 12/2005 |
| JP | 2005-336450 A | | 12/2005 |
| JP | 2006-28295 A | | 2/2006 |
| WO | WO 2005052087 A1 | * | 6/2005 |

OTHER PUBLICATIONS

Zhen-Kun Huang, Phase relations of the $Si_3N_4$-AlN-CaO system, Journal of Materials Science Letters, Mar. 1985, vol. 4, No. 3, pp. 255-259.

H. A. Hoppe et al., "Luminescence in $EU^{2+}$-doped $Ba_2Si_5N_8$: Fluorescence, thermoluminescence, and upconversion," *Journal of Physics and Chemistry of Solids*, 61 (2000) pp. 2001-2006.

Tanaka, "Fundamentals of Convergent Beam Electron Diffraction", *Institute of Multidisciplinary Research for Advanced Materials Tohoku University*, vol. 44, pp. 150-160, 2002.

Hashimoto et al., "Determination of the Space Group of $LaCrO_3$ by Convergent-Beam Electron Diffraction", *Journal of the Electrochemical Society*, 147 (12), pp. 4408-4410, 2000.

Uhoda, K. et al., The Crystal Structure and Photoluminescene Properties of a New Red Phosphor, Calcium Aluminum Silicon Nitride Doped with Divalent Europium, *The Electrochemical Society Inc.* (206th) Meeting), 2004, Abstract 2073, 1 page.

* cited by examiner

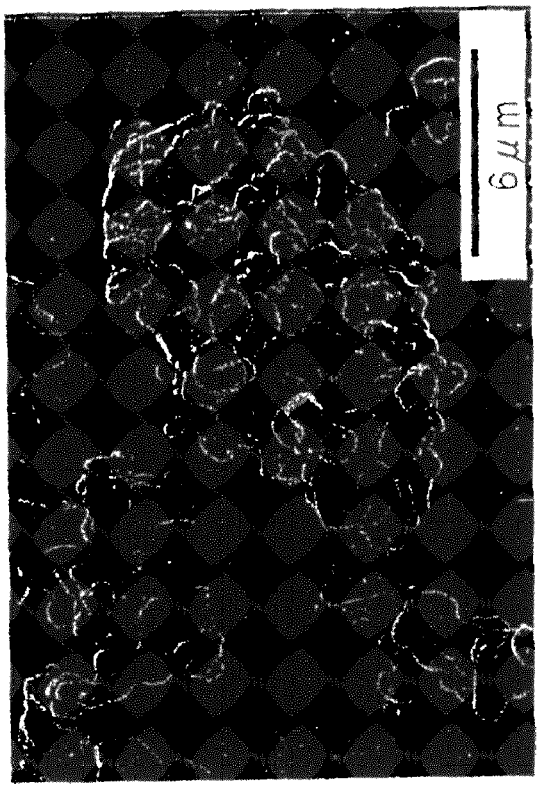

US 8,148,886 B2

RED NITRIDE PHOSPHOR AND PRODUCTION METHOD THEREOF

RELATED APPLICATION

This is a §371 of International Application No. PCT/JP2006/301595, with an international filing date of Jan. 25, 2006 (WO 2006/080535 A1, published Aug. 3, 2006), which is based on Japanese Patent Application No. 2005-022869, filed Jan. 31, 2005.

TECHNICAL

This disclosure relates to a red nitride phosphor for use in a display, a liquid crystal backlight, a fluorescent lamp, a white light-emitting diode and the like, and a production method thereof.

BACKGROUND ART

With recent implementation of a blue diode in practical use, studies are being aggressively made to develop a white light-emitting diode by utilizing the blue diode as a light source. The white light-emitting diode is lightweight, uses no mercury and has a long life, and the demand therefore is expected to rapidly expand in the future. The white light-emitting diode usually employed is prepared by coating a blue light-emitting device with a paste of a mixture of cerium-activated YAG ($Y_3Al_5O_{12}$:Ce) powder and epoxy resin (see, Japanese Unexamined Patent Publication (Kokai) No. 2000-208815).

However, the color of the YAG:Ce photoluminescence is present in the vicinity of x=0.41 and y=0.56 in the CE chromaticity coordinates and when mixed with the color of blue excited light at 460 nm, the color tone is controlled in a line connecting the color coordinates of the blue light-emitting diode and the color coordinates of YAG and therefore, the color is not white but becomes white mixed with green-blue color. Accordingly, there arises a problem that a white color insufficient in the red color results. In order to solve this problem of bad color tone, another phosphor powder of emitting a red color is mixed with the YAG:Ce phosphor powder, thereby controlling the color tone.

However, the number of reports on a phosphor of absorbing blue light and emitting red photoluminescence is very small. Specifically, for example, $Ba_2Si_5N_8$ activated by europium (Eu) has been reported in *Journal of Physics and Chemistry of Solids*, Vol. 61, pp. 2001-2006 (2000). Also, in recent years, Eu-activated $CaAlSiN_3$ having an emission intensity surpassing that of $Ba_2Si_5N_8$ has been found (see, *Extended abstracts, The 65th Autumn Meeting*, 2004, page 1283, *The Japan Society of Applied Physics*.)

Under these circumstances, we investigated for a novel red phosphor. In particular, since it has been experimentally found that in $CaAlSiN_3$:Eu, AlN is liable to remain, studies have been aggressively made on a composition system with less AlN. The AlN when Eu is contained therein emits green light in the vicinity of 535 nm and therefore, mingling of AlN into a red phosphor is not preferred. It could therefore be advantageous to provide a new red nitride phosphor capable of absorbing blue light and emitting red photoluminescence.

SUMMARY

As a result of extensive studies on an Eu-activated phosphor with respect to a system of calcium nitride ($Ca_3N_2$)-aluminum nitride (AlN)-silicon nitride ($Si_3N_4$), we found the presence of a red phosphor which is excited by blue light unlike conventionally reported $CaAlSiN_3$.

In this way, the following are provided.

(1) A red phosphor characterized in that the crystal phase constituting the phosphor is monoclinic Eu-activated $CaAlSiN_3$.

(2) The red phosphor as described in (1), which contains from 0.01 to 10 parts by weight of Eu per 100 parts by weight of the $CaAlSiN_3$ crystal phase.

(3) The red phosphor as described in (1) or (2), which does not contain free AlN.

(4) The red phosphor as described in (3), wherein AlN is not detected by the X-ray diffraction analysis.

(5) A red phosphor which is Eu-activated $CaAlSiN_3$ powder having an average particle diameter of 10 μm or less as measured in the non-pulverized state by the laser scattering particle size distribution analysis.

(6) A red phosphor which is a pulverized product of the Eu-activated $CaAlSiN_3$ powder described in (5).

(7) The red phosphor as described in (5) or (6), which is a monoclinic crystal.

(8) Monoclinic partially Eu-substituted $CaAlSiN_3$.

(9) Monoclinic $CaAlSiN_3$.

(10) A light-emitting device comprising a light-emitting element, a yellow phosphor and the red phosphor described in any one of (1) to (7).

(11) The light-emitting device as described in (10), wherein the light-emitting element is a blue light-emitting diode.

(12) The light-emitting device as described in (11), wherein the red phosphor converts the blue light emitted from the blue light-emitting element into red light.

(13) A method for producing monoclinic Eu-activated $CaAlSiN_3$, comprising firing a raw material powder comprising $Ca_3N_2$, AlN, $Si_3N_4$ and EuN at 1,400 to 2,000° C. in a nitrogen-containing atmosphere, the $Ca_3N_2$, AlN and $Si_3N_4$ giving a composition falling in the region surrounded by straight lines connecting the following four points A to D in the composition diagram of FIG. 1, that is, the four points defined by the following molar ratios of ($Ca_3N_2$:AlN:$Si_3N_4$):

Point A: (10:70:20)
Point B: (10:65:25)
Point C: (70:23:7)
Point D: (70:22:8), and EuN being contained in an amount of 0.01 to 10 parts by weight as Eu per 100 parts by weight in total of $Ca_3N_2$, AlN and $Si_3N_4$.

(14) The method as described in (13), wherein the firing is preformed at 1,600 to 2,000° C. in a pressurized nitrogen atmosphere.

(15) The method as described in (13) or (14), wherein $Ca_3N_2$ occupies from 20 to 40 mol % in 100 mol % in total of $Ca_3N_2$, AlN and $Si_3N_4$ constituting the raw material powder.

(16) The method as described in any one of (13) to (15), wherein the molar ratio of AlN and $Si_3N_4$ in the raw material powder is about 3:1.

(17) The method as described in any one of (13) to (16), which uses a raw material powder comprising EuN partially substituted by $Eu_2O_3$.

(18) The method as described in any one of (13) to (17), wherein amorphous $Si_3N_4$ or a nitrogen-containing silane compound is used as the raw material $Si_3N_4$.

(19) The method as described in any one of (13) to (18), wherein the nitrogen-containing atmosphere is a nitrogen atmosphere.

(20) The method as described in any one of (13) to (19), wherein the monoclinic Eu-activated CaAlSiN$_3$ crystal after firing is further acid-cleaned to remove an oxide.

(21) The method as described in any one of (13) to (20), wherein the monoclinic Eu-activated CaAlSiN$_3$ is a red phosphor.

(22) A method for producing a light-emitting device, comprising using the red phosphor described in any one of (1) to (7), a yellow phosphor and a light-emitting element.

FIGS. 21A and 21B are scanning electron micrographs showing the particle form in Example 4 and Comparative Example 10, respectively.

DETAILED DESCRIPTION

The red nitride phosphor and the production method thereof are described below.

(First Aspect)

Figure 3:
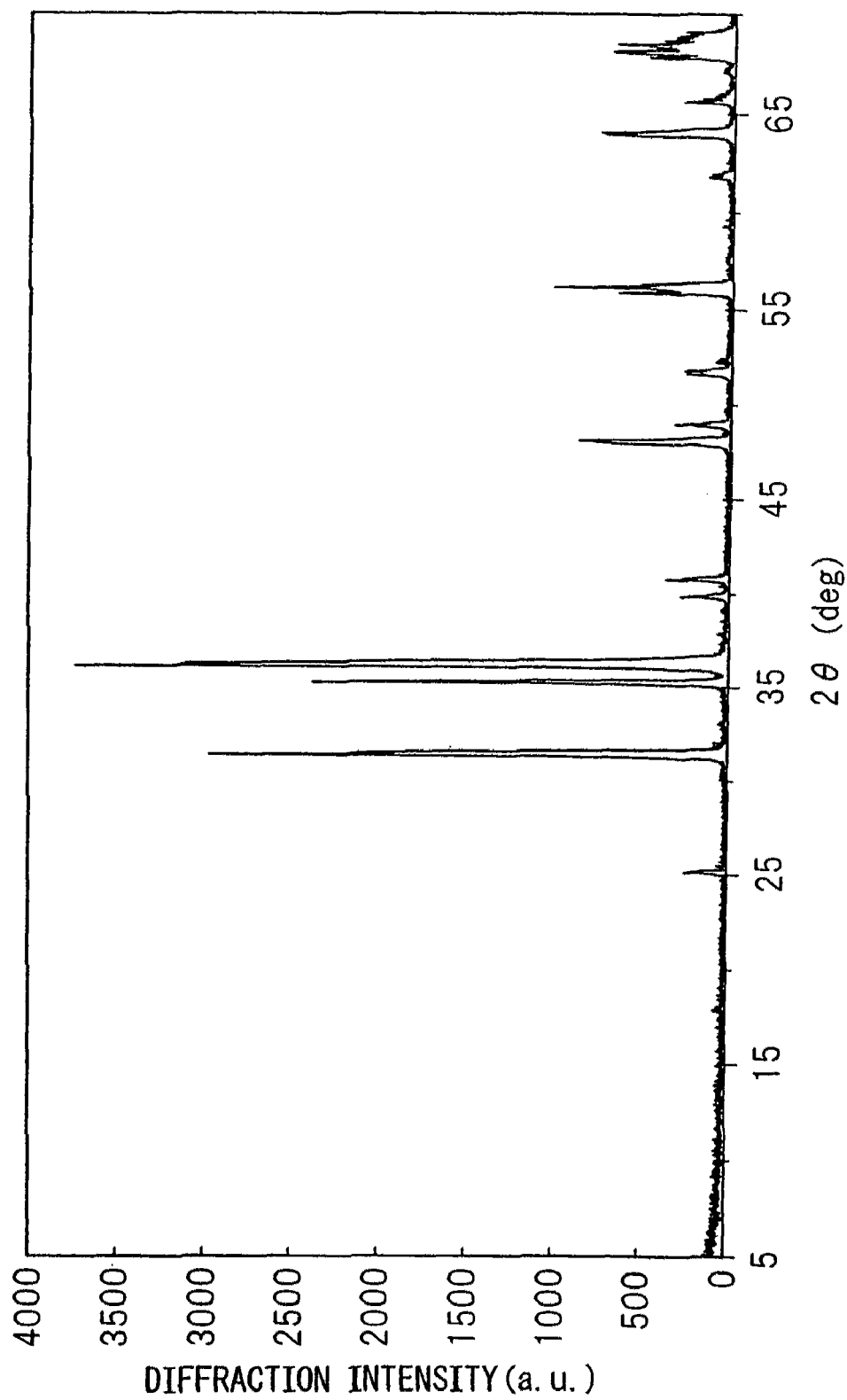
FIG. 3 is an X-ray diffraction pattern of the powder obtained by acid-cleaning the fired product of Example 1.
Figure 20:
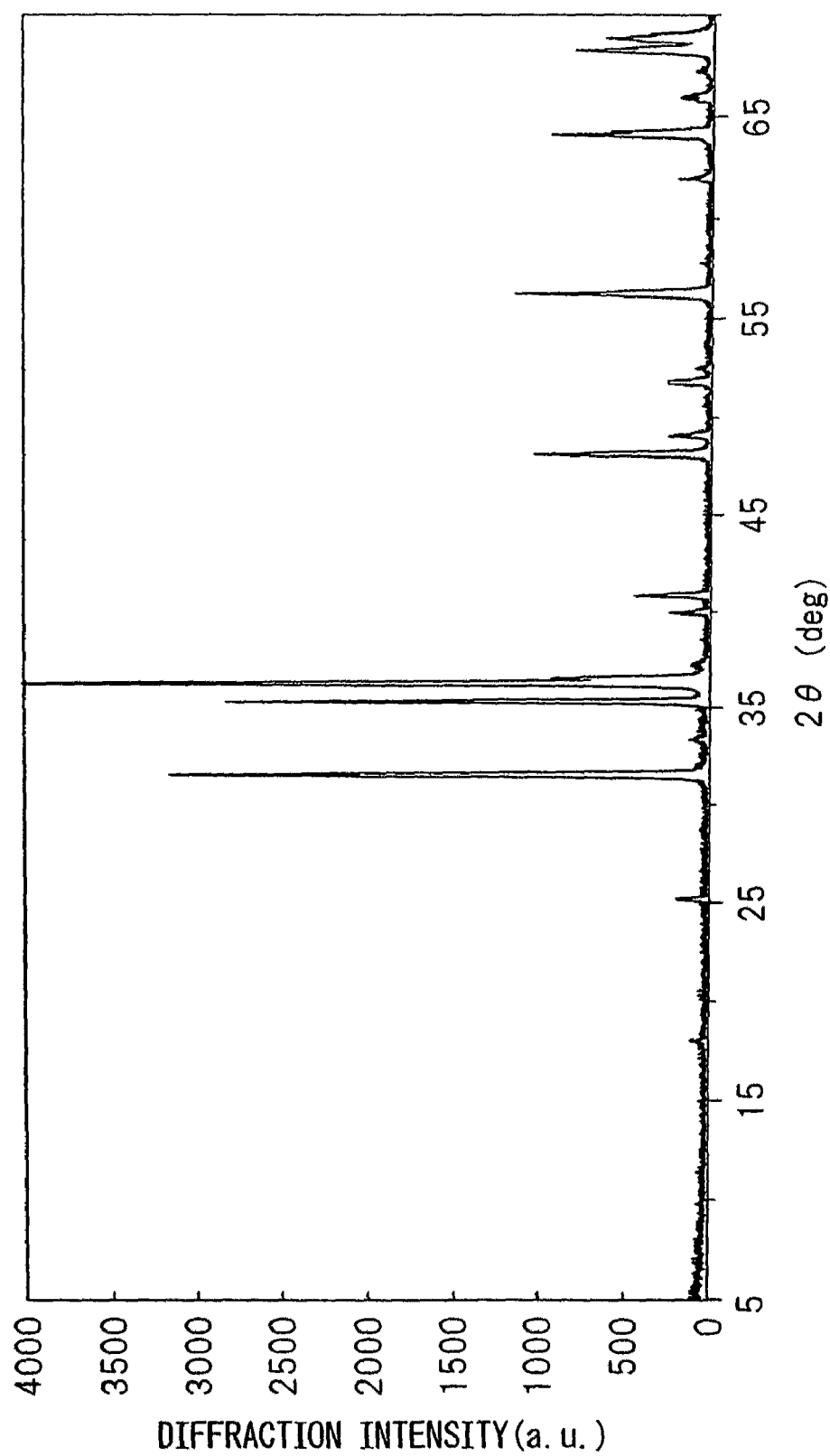
FIG. 20 is an X-ray diffraction pattern of the powder of the fired product obtained in Comparative Example 9.

FIG. 3 shows an X-ray diffraction pattern of the red phosphor in the first aspect (hereinafter sometimes simply referred to as a "red phosphor"). For the purpose of comparison, CaAlSiN$_3$ was produced by the method disclosed in *Extended abstracts, The 65$^{th}$ Autumn Meeting*, 2004, page 1283, *The Japan Society of Applied Physics* (hereinafter referred to as "Reference 1"), and the X-ray diffraction pattern thereof was measured (Comparative Example 9). FIG. 20 shows the results. When the X-ray diffraction pattern of FIG. 20 is compared with the diffraction pattern of CaAlSiN$_3$ disclosed in Reference 1, it is confirmed that the X-ray patterns coincide, despite slight slippage in the diffraction position (because of difference in the Eu content), and the phosphor crystal obtained in Comparative Example 9 is CaAlSiN$_3$ disclosed in Reference 1. Incidentally, this analysis was performed by excluding the peak of AlN remaining in the crystal.

Figure 4:
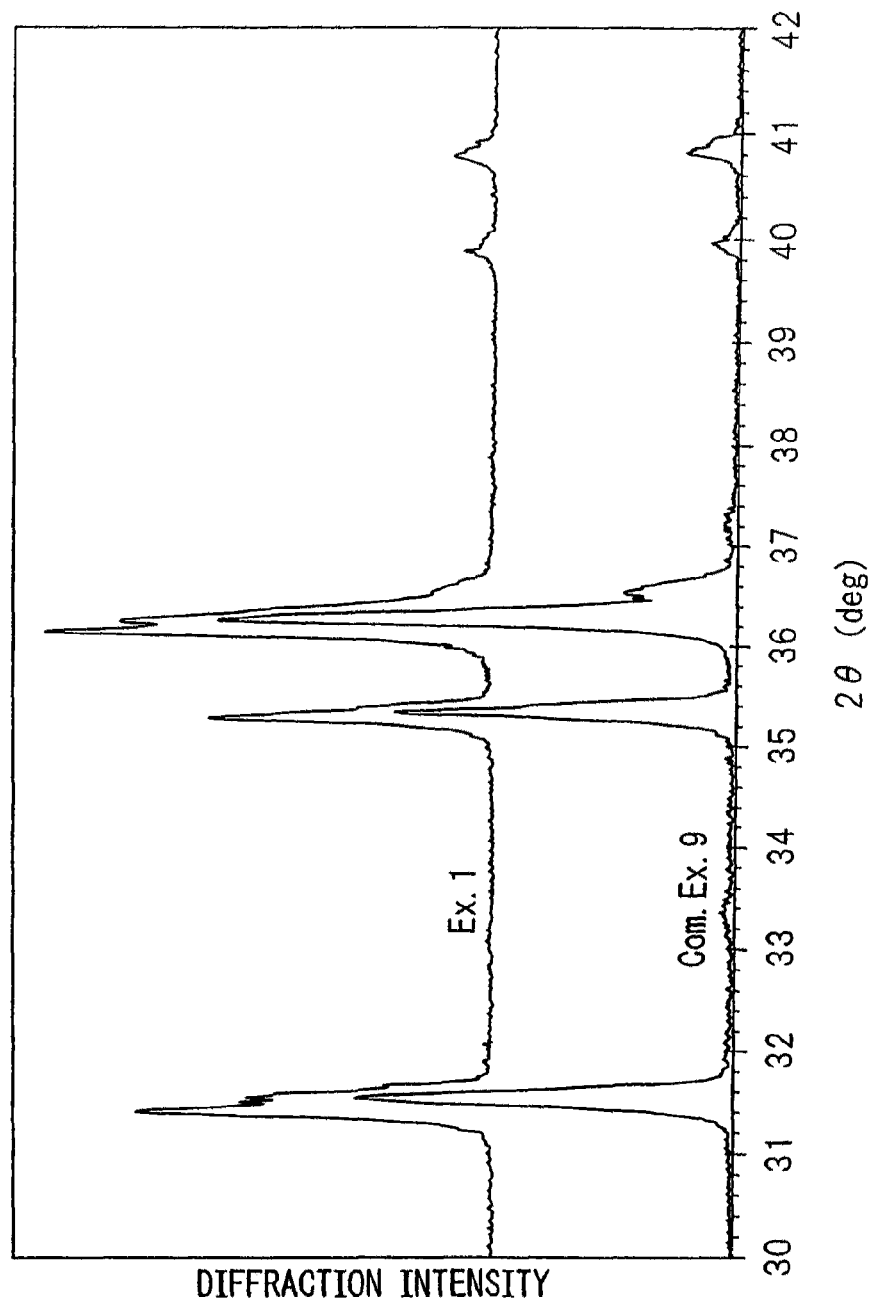
FIG. 4 is a comparison of X-ray diffraction patterns of the powders of Example 1 and Comparative Example 9.
Figure 5:
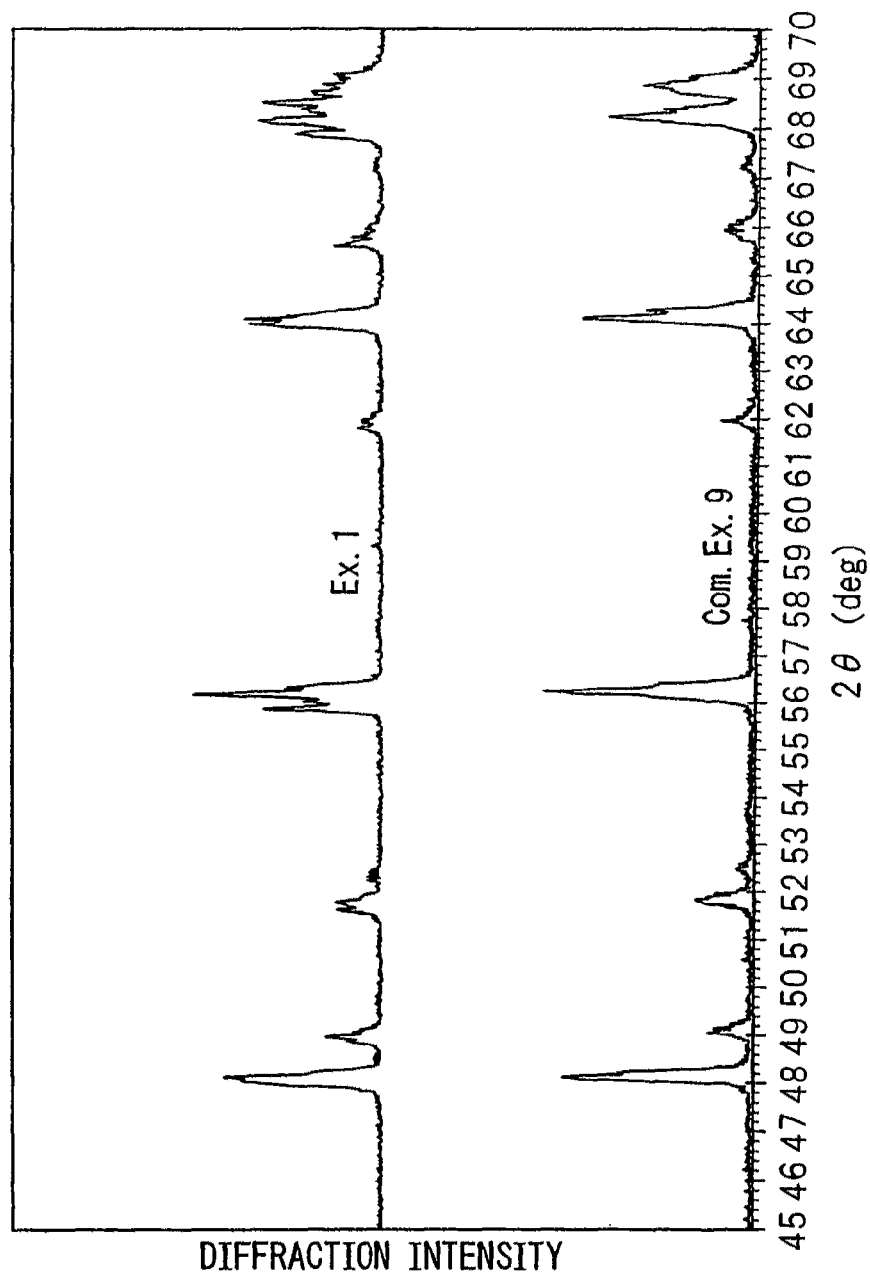
FIG. 5 is a comparison of X-ray diffraction patterns of the powders of Example 1 and Comparative Example 9.

Then, the red phosphor (FIG. 3, Example 1) is compared with CaAlSiN$_3$ disclosed in Reference 1 (FIG. 20, Comparative Example 9). The X-ray diffraction patterns of FIGS. 3 and 20 are closely similar but greatly differ in small details. These are described. FIG. 4 is a comparison in the portion where 2θ (hereinafter the same) is from 30° to 42°. In the case of red phosphor, the peak in the vicinity of 31.5° and the peak in the vicinity of 36.3° each is split to allow for appearance of peaks different from CaAlSiN$_3$. FIG. 5 shows a comparison in the portion from 45° to 70°. Also in this portion, the peak in the vicinity of 56.2° is split. Moreover, it is seen that the diffraction pattern over the region from 68° to 69° greatly differs. From these, the red phosphor is different from the CaAlSiN$_3$ red phosphor disclosed in Reference 1.

Furthermore, the crystal structure is analyzed based on the X-ray diffraction pattern of FIG. 3. As a result, this crystal phase is found to belong to the monoclinic system. When the lattice constants thereof are a=11.6934, b=9.8697, c=5.7160 and β=117.2630, best coincidence is observed between the calculated peak position and the actually measured peak position. The CaAlSiN$_3$ disclosed in Reference 1 is an orthorhombic system and its lattice constants are reported that a=9.8007, b=5.6497 and c=5.0627. In this way, it is clear that the crystal phase of the red phosphor differs from the crystal phase reported in Reference 1.

The composition is then described below. The composition analysis results of the red phosphor are shown in Table 2. In Table 2, the theoretical weight % of each element of CaAlSiN$_3$ is shown together for the purpose of comparison. The analytical values of the red phosphor are very close to the values of CaAlSiN$_3$. Considering that perfect quantitative analysis is very difficult, the composition of this phosphor can be regarded as almost the same as the composition of CaAlSiN$_3$. When the above-described discussion on the X-ray diffraction pattern is combined with the results of this composition analysis, the red phosphor is CaAlSiN$_3$ belonging to the monoclinic system. However, a portion of Ca sites is substituted by Eu and the amount of the substitution is 0.01 to 8.8 mol % based on Ca sites but is preferably 0.1 to 5.0 mol %, more preferably 0.8 to 3.0 mol %.

Figure 6:
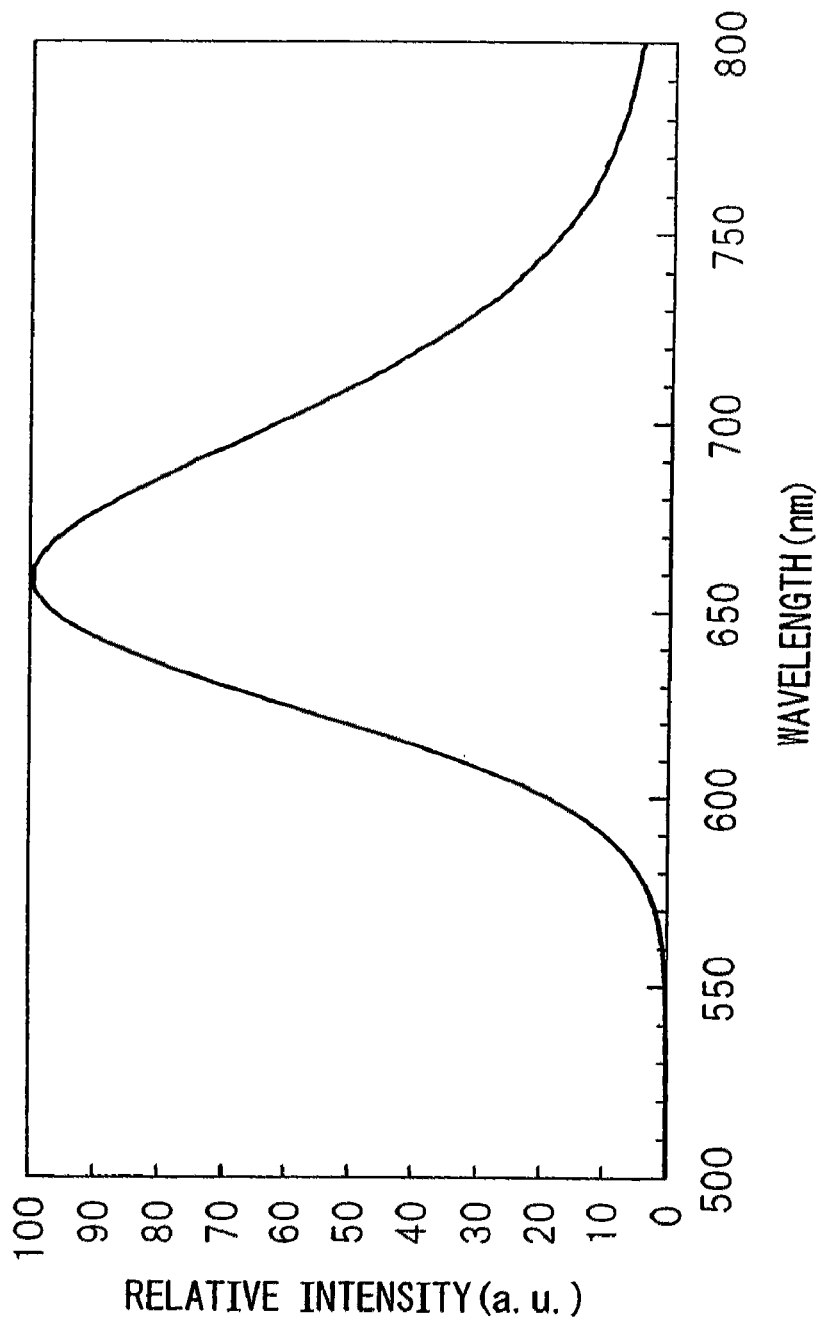
FIG. 6 is a photoluminescence spectrum of the red nitride phosphor obtained in Example 1.
Figure 7:
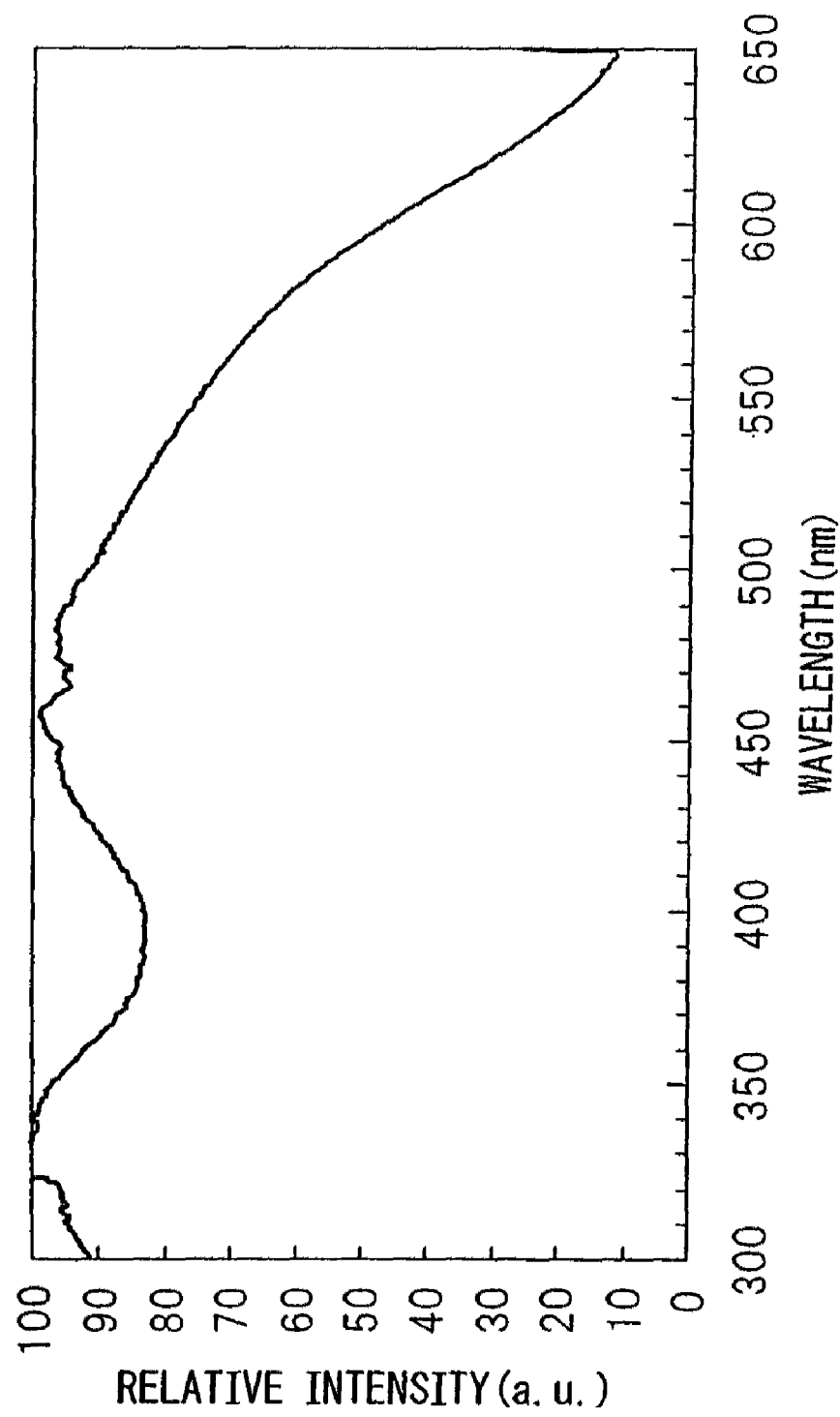
FIG. 7 is an excitation spectrum of the red nitride phosphor obtained in Example 1.

The photoluminescence characteristics of the red phosphor are described below. FIG. 6 shows a photoluminescence spectrum when the red phosphor is excited by blue light at 450 nm. The wavelength of photoluminescence generated by the blue excitation is 660 nm (red) and this reveals suitability as a red phosphor by blue light excitation. Accordingly, the red phosphor can be used as a red phosphor for controlling the color tone of a white light-emitting diode fabricated by combining a blue light-emitting diode and YAG:Ce. Also, FIG. 7 shows an excitation spectrum when the photoluminescence wavelength is changed to 660 nm. The phosphor exhibits high emission over a region from 300 to 520 nm and is verified to be usable as a good phosphor in the region from ultraviolet to blue.

The internal quantum efficiency of the phosphor was measured. The phosphor of Reference 1 was used for comparison (Comparative Example 9). Assuming that the quantum efficiency of the phosphor of Comparative Example 9 is 100, the quantum efficiency of the phosphor was 117, and the CaAlSiN$_3$ belonging to the monoclinic system was verified to be a superior phosphor (see, Table 3).

The production method of the red phosphor is described below. First, the nitride raw material for use in the production of the nitride phosphor is described. As for the raw material, Ca$_3$N$_2$, EuN, AlN and Si$_3$N$_4$ are used. The method for producing the raw material may be any method as long as the above-described nitride can be finally obtained. Here, a representative production method of the raw material is described.

Ca$_3$N$_2$ can be produced by directly nitriding metallic calcium. The nitride is produced by charging metallic calcium into a carbon or BN crucible and heating it at 600 to 900° C. The calcium nitride is also available on the market, and a commercially available product (for example, produced by Aldrich) may be used.

EuN can also be obtained by directly nitriding metallic europium. Metallic europium is pulverized in a nitrogen box by using a file, the fine particles are charged into a carbon-made or BN-made crucible, and the crucible is placed in a firing furnace and heated at 600 to 900° C. in a nitrogen atmosphere, thereby performing nitridation. EuN may be partially substituted by Eu$_2$O$_3$.

As for AlN, a direct nitridation method or a method of reducing and nitriding aluminum is employed, but high-purity AlN is widely available on the market and this may be used. For example, AlN (grade F) produced by Tokuyama Corp. may be utilized.

The Si$_3$N$_4$ powder can be obtained by a known method. For example, amorphous silicon nitride can be produced by a method where a nitrogen-containing silane compound (an Si—N—H based precursor compound) such as silicon diimide produced by reacting a silicon halide (e.g., silicon tetrachloride, silicon tetrabromide, silicon tetraiodide) with ammonia in a gas or liquid phase state is decomposed under heating at 600 to 1,200° C. in an ammonia gas atmosphere, or a method where a silicon halide and ammonia each in a gas state are reacted at a high temperature. Furthermore, by firing this amorphous silicon nitride at 1,400 to 1,600° C. in a nitrogen atmosphere, crystalline silicon nitride can be obtained.

The red nitride phosphor can be obtained by using Ca$_3$N$_2$, EuN, AlN and Si$_3$N$_4$ as raw materials, weighing a desired weight of each raw material, and after mixing, firing the mixture in nitrogen atmosphere, for example.

Figure 1:
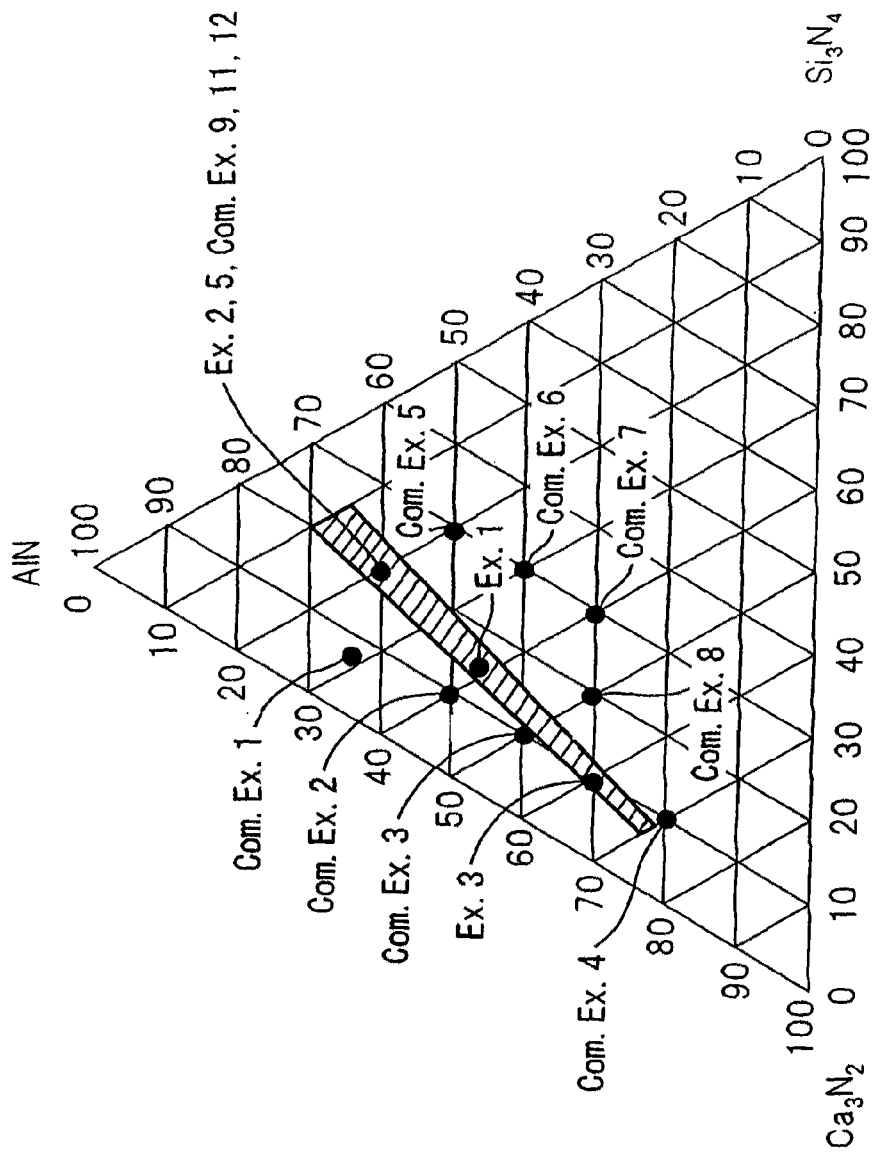
FIG. 1 is a triangular diagram showing the composition range of the raw material powder for our phosphors and the compositions of Examples and Comparative Examples.

The composition range of the raw materials for producing the red nitride phosphor is shown by slanted lines (hatching) in the composition diagram of FIG. 1. In FIG. 1, the slanted line region is a region surrounded by straight lines connecting the following four points A to D, that is, the four points defined by the following molar ratios of (Ca$_3$N$_2$:AlN:Si$_3$N$_4$):

Point A: (10:70:20)
Point B: (10:65:25)
Point C: (70:23:7)
Point D: (70:22:8).

This composition is represented by $xCa_3N_2 \cdot yAlN \cdot zSi_3N_4$ (wherein $x+y+z=100$, $10 \leq x \leq 70$, $y:z=(72:28)$ to $(78:22)$).

The red phosphor can be obtained by using raw materials in the above-described composition range, and the molar ratio of AlN and Si$_3$N$_4$ is most preferably 3:1, but a molar ratio in the range of 3±0.3:1 is preferred. Also, Ca$_3$N$_2$ occupies from 10 to 70 mol %, preferably from 20 to 40 mol %, in 100 mol % in total of Ca$_3$N$_2$, AlN and Si$_3$N$_4$ constituting the raw material powder.

EuN as a starting material is preferably added in an amount of 0.01 to 10 parts by weight as Eu, more preferably from 0.05 to 5 parts by weight as Eu, still more preferably from 1 to 3 parts by weight as Eu, per 100 parts by weight in total of Ca$_3$N$_2$, AlN and Si$_3$N$_4$.

Incidentally, added EuN becomes Eu at the firing stage and occupies Ca site of the product (monoclinic CaAlSiN$_3$). Thus, the composition should be considered using (Ca+Eu), but if the amount of the substitution is small, the result is the same between the case where Eu is added and the case where (Ca+Eu) is considered. Therefore, the method of using addition of Eu is used.

The method for mixing those starting materials is not particularly limited, and a method known in itself, such as a method of dry-mixing the starting materials or a method of wet-mixing the starting materials in an inactive solvent substantially incapable of reacting with each component of raw materials and then removing the solvent, may be employed. As for the mixing device, a V-shaped mixing machine, a rocking mixer, a ball mill, a vibration mill, a medium stirring mill or the like is suitably used.

The mixture of starting materials is fired at 1,400 to 2,000° C. in a nitrogen-containing atmosphere, whereby the objective phosphor can be obtained.

Typically, the mixture is fired at 1,400 to 1,800° C., preferably from 1,500 to 1,700° C., in a nitrogen-containing atmosphere at 1 atm, whereby the objective phosphor can be obtained. If the firing temperature is less than 1,400° C., heating for a long time is necessary for the growth of the desired phosphor and this is not practical. Also, the production ratio of the phosphor in the produced powder decreases. If the firing temperature exceeds 1,800° C., this causes significant evaporation of calcium and europium and a bright phosphor may not be obtained. The nitrogen-containing atmosphere may contain, in addition to nitrogen, an inert gas of not affecting the composition of the red nitride phosphor, such as rare gas, argon gas and helium gas (hereinafter, when a "nitrogen-containing atmosphere" is referred to, the same applies; accordingly, a nitrogen atmosphere and a nitrogen-inert gas mixed atmosphere may also be called a "nitrogen-containing inactive atmosphere").

Also, the mixed powder of starting materials may be fired at a temperature of 1,600 to 2,000° C., preferably from 1,600 to 1,900° C., in a pressurized nitrogen gas atmosphere. In this case, the pressurization of nitrogen gas prevents evaporation of calcium and europium as well as sublimation and decomposition of Si$_3$N$_4$, and a desired phosphor can be obtained in a short time. By increasing the nitrogen gas pressure, the firing temperature may be elevated, but the mixed powder can be fired, for example, at 1,600 to 1,850° C. under a nitrogen gas pressure of 5 atm and at 1,600 to 2,000° C. under a nitrogen gas pressure of 10 atm.

The heating furnace used for the firing of the powder mixture is not particularly limited and, for example, a batch electric furnace by a high frequency induction heating system or resistance heating system, a rotary kiln, a fluidized kiln or a pusher electric furnace can be used.

The method for producing a red nitride phosphor is characterized by firing a raw material powder resulting from adding and mixing from 0.01 to 10 parts by weight as Eu of EuN to 100 parts by weight of a mixture comprising $Ca_3N_2$, AlN and $Si_3N_4$ shown by the composition range (slanted line part) of FIG. 1, at 1,400 to 2,000° C. in a nitrogen-containing atmosphere. Furthermore, unnecessary oxide remaining after acid-cleaning the fired red nitride phosphor is preferably removed.

The red nitride phosphor is described below. The red nitride phosphor is a main component in a fired product obtained by firing a raw material powder resulting from adding and mixing from 0.01 to 10 parts by weight as Eu of EuN to 100 parts by weight of a mixture comprising $Ca_3N_2$, AlN and $Si_3N_4$ shown by the composition range (slanted line part) of FIG. 1, at 1,400 to 2,000° C. in a nitrogen-containing atmosphere, and this is monoclinic Eu-activated $CaAlSiN_3$. This red nitride phosphor can absorb light at least in a part of the primary light having a peak wavelength in the range of 270 to 520 nm and emit the secondary light having a peak wavelength in the range of 580 to 680 nm. The red nitride phosphor can be similarly obtained also by using a raw material in which EuN is partially substituted by $Eu_2O_3$. Accordingly, the red phosphor may contain a small amount of oxygen.

In the fired product, calcium oxide (CaO) sometimes remains, but CaO can be removed by the cleaning with an acid and therefore, causes no problem. If the above-described raw material composition range is not kept, an objective phosphor may not be obtained and even when an objective phosphor is obtained, a sufficiently high photoluminescence intensity cannot be achieved. Furthermore, in the case of a composition having a large AlN content, there arises a problem that AlN remains in the phosphor after firing. Unlike CaO, AlN cannot be removed by cleaning with an acid and is not preferred in use as a phosphor.

The red nitride phosphor is monoclinic Eu-activated $CaAlSiN_3$, but a phosphor not containing free AlN can be obtained. In particular, a phosphor not exhibiting a peak assignable to AlN in the X-ray diffraction analysis can be obtained. The AlN content in the red nitride phosphor may be 10 mol % or less, even 3 mol % or less.

We also provide a light-emitting device (e.g., lamp) fabricated by combining the above-described red nitride phosphor with a light-emitting element, particularly, with a blue light-emitting element and a yellow phosphor. The red nitride phosphor can emit red photoluminescence with high efficiency by blue excitation and therefore, a lamp with excellent color tone can be provided by using a blue light-emitting element and a yellow phosphor (YAG:Ce).

The monoclinic partially Eu-substituted $CaAlSiN_3$ and the monoclinic $CaAlSiN_3$, which are provided, both are considered to be a novel crystalline material. It is apparent that monoclinic $CaAlSiN_3$ can be similarly produced without partially substituting it by Eu.

(Second Aspect)

In the second aspect, we provide a red phosphor which is Eu-activated $CaAlSiN_3$ powder having an average particle diameter of 10 µm or less as measured in the non-pulverized state by the laser scattering particle size distribution analysis, and a red phosphor which is a pulverized product of the Eu-activated $CaAlSiN_3$ powder. This Eu-activated $CaAlSiN_3$ may also be a monoclinic crystal.

In $CaAlSiN_3$ reported at present, primary particles of 2 to 3 µm are aggregated to form a secondary particle (see, *The 305th Meeting Technical Digest, November,* 2004, page 37, *Phosphor Research Society (Japan)*; hereinafter referred to as "Reference 2"). It is pointed out that when a phosphor for a white light-emitting diode contains an extremely large particle, alignment of the phosphor becomes non-uniform and this leads to light emission unevenness or product unevenness (see, *Materials Integration*, Vol. 16, No. 7, page 41 (2003)). Therefore, the presence of a large secondary particle contained in $CaAlSiN_3$ is not preferred. In order to eliminate a large secondary particle, a method of pulverizing the powder produced may be considered. However, in general, when the phosphor powder is pulverized, there arises a problem that the light emission intensity decreases. Also in the case of $CaAlSiN_3$, it has been already reported that when a secondary particle is removed by pulverization, the light emission intensity is decreased (see, Reference 2). As for the method of obtaining a phosphor not containing a large secondary particle without pulverizing the powder, Reference 2 has proposed to study a flux agent. However, when a flux is used, washing for removing the flux after the production of a phosphor powder must be performed. Therefore, the powder is preferably produced without using a flux.

We considered that the aggregate particle in $CaAlSiN_3$ is attributable to the production of a glass phase due to slight oxygen contained in the raw material and adhesion of crystal particles through the glass phase, and performed the production of $CaAlSiN_3$ by using a crystalline silicon nitride with less oxygen. However, only a powder containing a large secondary particle could be produced without any effect of improvement. This suggests that an aggregate particle is produced by another mechanism in addition to the aggregation of primary particles by the adhesion through a composition of forming a glass, such as oxygen. As a result of studies, it has been confirmed that primary particles are taking an aggregation form where primary particles are contacted with each other at respective faces to form a dense secondary particle (see, FIG. 21B) and the secondary particles are further aggregated to form a large lump. Therefore, considering that if the contact at faces of primary particles is reduced, a $CaAlSiN_3$ powder reduced in a large secondary particle and a huge secondary particle resulting from further aggregation of the secondary particles can be obtained.

The primary particles are considered to contact at faces because at the nucleation of $CaAlSiN_3$, each crystal nucleus undergoes spatially dense nucleation. The cause thereof is estimated in that the entire raw material is densified, that is, the bulk density of the raw material is high. It seems to be also important not to concentrate the formation of $CaAlSiN_3$ crystal nuclei in a specific site. For solving these problems, it has been found that when amorphous silicon nitride or a nitrogen-containing silane compound which is a precursor of the amorphous silicon nitride is utilized, a $CaAlSiN_3$ phosphor powder greatly decreased in a large secondary particle with less aggregation of primary particles can be obtained. The second aspect has been achieved based on this finding.

According to the second aspect, a fine and uniform $CaAlSiN_3$ powder is provided without using pulverization or a flux.

The $CaAlSiN_3$ powder in the second aspect can be produced by using amorphous silicon nitride as the raw material of $CaAlSiN_3$. The amorphous silicon nitride has a very small bulk density of about 0.1 g/ml. On the other hand, crystalline silicon nitride has a bulk density of about 0.7 g/ml and when the weight is the same, the volume thereof is as large as about 7 times. Therefore, when the raw material powder of $CaAlSiN_3$ is produced by using amorphous silicon nitride, the raw material powder also comes to have a very small bulk density as compared with the case of using crystalline silicon nitride, and a powder having a high bulk is obtained. As a result, at the formation of $CaAlSiN_3$ crystal nuclei, nucleation can occur in a spatially distant manner. In addition to the spatial factor, the size of the crystalline silicon nitride produced from amorphous silicon nitride is considered to have an effect. More specifically, when the raw material powder containing the amorphous silicon nitride is heated in a nitrogen atmosphere, since the crystallization temperature of silicon nitride is lower than the reaction temperature of $CaAlSiN_3$, the silicon nitride component undergoes nucleation and becomes crystalline silicone nitride. In this case, the silicon nitride component can contact with $Ca_3N_2$ and AlN as other raw material components at the stage of a very small crystal size as compared with crystalline silicon nitride, so that when amorphous silicon nitride is used, uniform nucleation of $CaAlSiN_3$ can occur. On the other hand, when crystalline silicon nitride is used, it is expected that the reaction with $Ca_3N_2$ and AlN proceeds on each raw material surface in a solid phase reaction manner and non-uniform nucleation results. In this way, the aggregation of primary particles is considered to decrease when amorphous silicon nitride is used, because nucleation can occur in a spatially distant manner and uniform nucleation can be attained.

The method for producing $CaAlSiN_3$ powder in the second aspect may be the same as the production method described with respect to the first aspect.

Typically, the $CaAlSiN_3$ powder in the second aspect can be produced, for example, by firing a raw material powder resulting from mixing from 0.01 to 10 parts by weight as Eu of EuN to 100 parts by weight of a mixture comprising 20 mol % of $Ca_3N_2$, 60 mol % of AlN and 20 mol % of $Si_3N_4$, at 1,400 to 1,800° C. in a nitrogen-containing inactive atmosphere.

By using amorphous silicon nitride as the raw material of $CaAlSiN_3$, a red phosphor which is Eu-activated $CaAlSiN_3$ powder having an average particle diameter of 10 μm or less as measured in the non-pulverized state by the laser scattering particle size distribution analysis, and a red phosphor which is a pulverized product of the Eu-activated $CaAlSiN_3$ powder, can be provided.

This red phosphor is $CaAlSiN_3$ powder and can absorb light at least in a part of the primary light from an excitation source having a peak wavelength in the range of 270 to 520 nm and emit light of the secondary light having a peak wavelength in the range of 580 to 680 nm.

This red phosphor is a fine and uniform $CaAlSiN_3$ powder obtained without using pulverization or a flux. Even when the powder is pulverized, the degree of pulverization can be small to obtain a 90% diameter ($D_{90}$) of 45 μm or less, preferably 20 μm or less. Accordingly, reduction in the light emission intensity due to pulverization can be prevented or decreased.

(Light-Emitting Apparatus)

Figure 25:
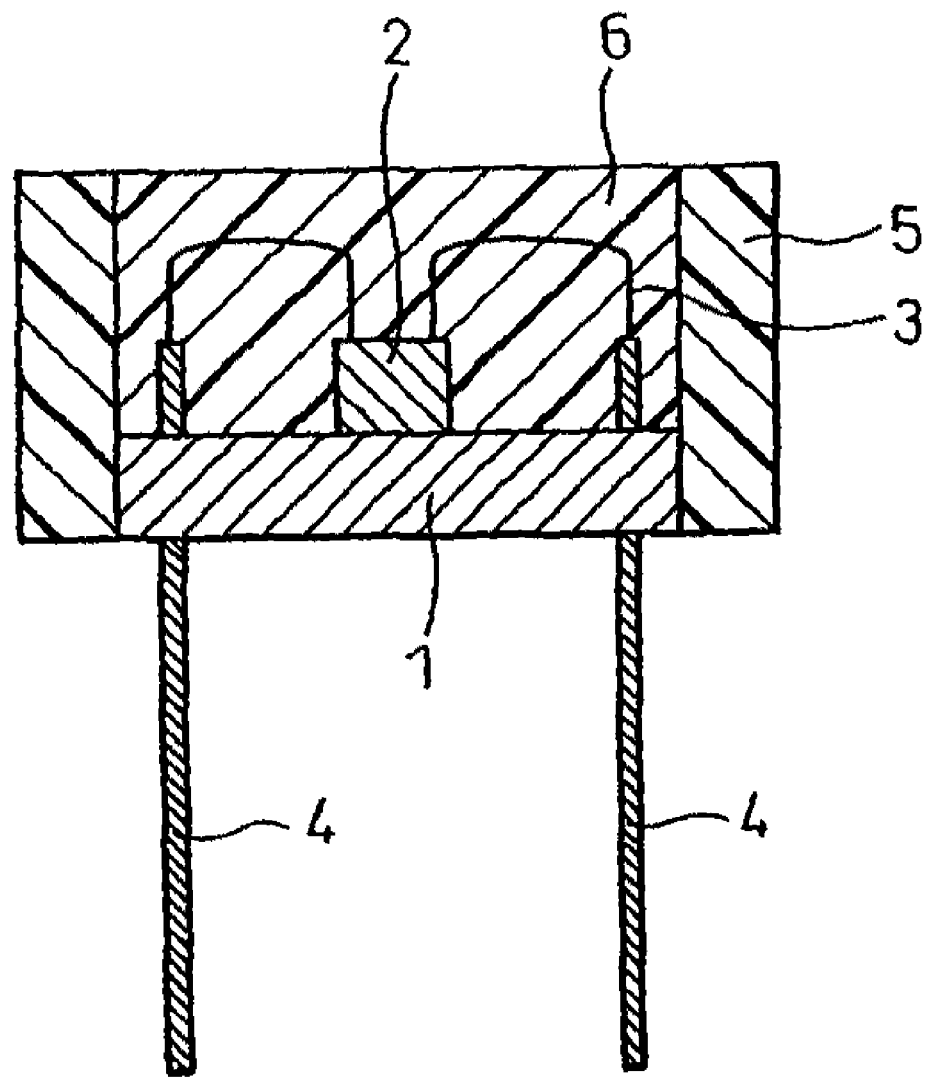
FIG. 25 shows a lamp using a light-emitting diode and a red phosphor, which is an example of the light-emitting device.

FIG. 25 shows an example of the lamp using the red nitride phosphor. The light-emitting diode 2 on a substrate 1 is connected to leads 4 through metal wires 3. The light-emitting diode 2 is buried in a resin 6 containing the red nitride phosphor and Ce-activated YAG (YAG:Ce; a yellow phosphor) within a container 5. When the light-emitting diode 2 emits blue light, the red nitride phosphor absorbs a part of the light and emits red light as well as the Ce:YAG absorbs a part of the light and emits yellow light. The remaining blue light emitted by the light-emitting diode 2 and not absorbed by the red nitride phosphor or the yellow phosphor is mixed with red light emitted by the red nitride phosphor and yellow light emitted by the yellow phosphor, and white or other light as a whole is emitted from the lamp.

EXAMPLES

Aspects of phosphors are described in greater detail below by referring to Examples. For clearly illustrating the composition in the preparation of the raw material powder, the composition point in each of Examples and Comparative Examples is shown in FIG. 1. Also, the raw material compositional ratio in each of Examples and Comparative Examples is shown in Table 1.

TABLE 1

| | (mol %) (total 100 parts by weight) | | | added parts by weight |
|---|---|---|---|---|
| | $Ca_3N_2$ | AlN | $Si_3N_4$ | as Eu |
| Example 1 | 38.5 | 46.1 | 15.4 | 1.5 |
| Example 2 | 20.0 | 60.0 | 20.0 | 1.5 |
| Example 3 | 60.0 | 30.0 | 10.0 | 1.5 |
| Comparative Example 1 | 28.6 | 64.3 | 7.1 | 1.5 |
| Comparative Example 2 | 40.0 | 50.0 | 10.0 | 1.5 |
| Comparative Example 3 | 50.0 | 40.0 | 10.0 | 1.5 |
| Comparative Example 4 | 70.0 | 20.0 | 10.0 | 1.5 |
| Comparative Example 5 | 20.0 | 50.0 | 30.0 | 1.5 |
| Comparative Example 6 | 30.0 | 40.0 | 30.0 | 1.5 |
| Comparative Example 7 | 40.0 | 30.0 | 30.0 | 1.5 |
| Comparative Example 8 | 50.0 | 30.0 | 20.0 | 1.5 |
| Comparative Example 9 | 20.0 | 60.0 | 20.0 | 1.5 |
| Comparative Example 11 | 20.0 | 60.0 | 20.0 | 1.5 |
| Example 5 | 20.0 | 60.0 | 20.0 | 2.5 |
| Comparative Example 12 | 20.0 | 60.0 | 20.0 | 11.0 |

(Light-Emitting Apparatus)

Example 1

For obtaining EuN powder as the raw material, direct nitridation of metallic europium was performed. In a nitrogen box, metallic europium (produced by Soekawa Chemical Co., Ltd., 99.9%, massive) was filed to obtain fine particulate metallic europium of 350 μm or less. The obtained fine particulate metallic europium was charged into a carbon crucible and in a nitrogen atmosphere, the crucible was kept at 500° C. for 15 minutes, then kept at 750° C. for 2 hours, further kept at 900° C. for 1 hour, and cooled in the furnace. After cooling, the crucible was placed in a nitrogen box and EuN was taken out in a nitrogen atmosphere. This powder was pulverized to a powder of 150 micron or less and used as the raw material.

Subsequently, for obtaining $Ca_3N_2$ powder, direct nitridation of metallic calcium was performed. In a nitrogen box, metallic calcium (produced by Wako Pure Chemical Industries, Ltd., 99.0%, granular) was charged into a carbon crucible and in a nitrogen atmosphere, the crucible was kept at 450° C. for 4 hours, then kept at 750° C. for 4 hours, and cooled in the furnace. After cooling, the crucible was placed in a nitrogen box and $Ca_3N_2$ was taken out in a nitrogen atmosphere. This powder was pulverized to a powder of 150 micron or less and used as the raw material.

The $Si_3N_4$ powder was produced as follows. Silicon diimide obtained by reacting silicon tetrachloride and ammonia at a temperature lower than room temperature was heat-treated at 1,200° C. to obtain amorphous silicon nitride powder, and this powder was used as the raw material. As for the AlN powder, a commercially available product (grade F, produced by Tokuyama Corp.) was used.

These raw materials were weighed in a nitrogen box at a ratio of $Ca_3N_2$:$AlN$:$Si_3N_4$=38.5:46.1:15.4 (mol %), and 1.5 parts by weight as Eu of EuN was further added to 100 parts by weight of the raw materials obtained at the above-described ratio. These raw materials were mixed in a vibration mill for 1 hour in a nitrogen gas atmosphere, and the mixed powder was charged into a boron nitride (BN) crucible in a nitrogen box. This crucible was placed in a carbon-made crucible, set in an induction heating furnace, and then heated in a nitrogen atmosphere by a temperature rising schedule of 1 hour from room temperature to 1,200° C., 4 hours from 1,200 to 1,400° C. and 3 hours from 1,400 to 1,650° C., and after keeping at 1,650° C. for 1 hour, the heating was stopped. The crucible was cooled in the furnace and the powder was taken out.

The produced phosphor powder was irradiated with light of an ultraviolet lamp of emitting light at 365 nm in terms of the center wavelength, as a result, bright red light emission was confirmed.

Figure 2:
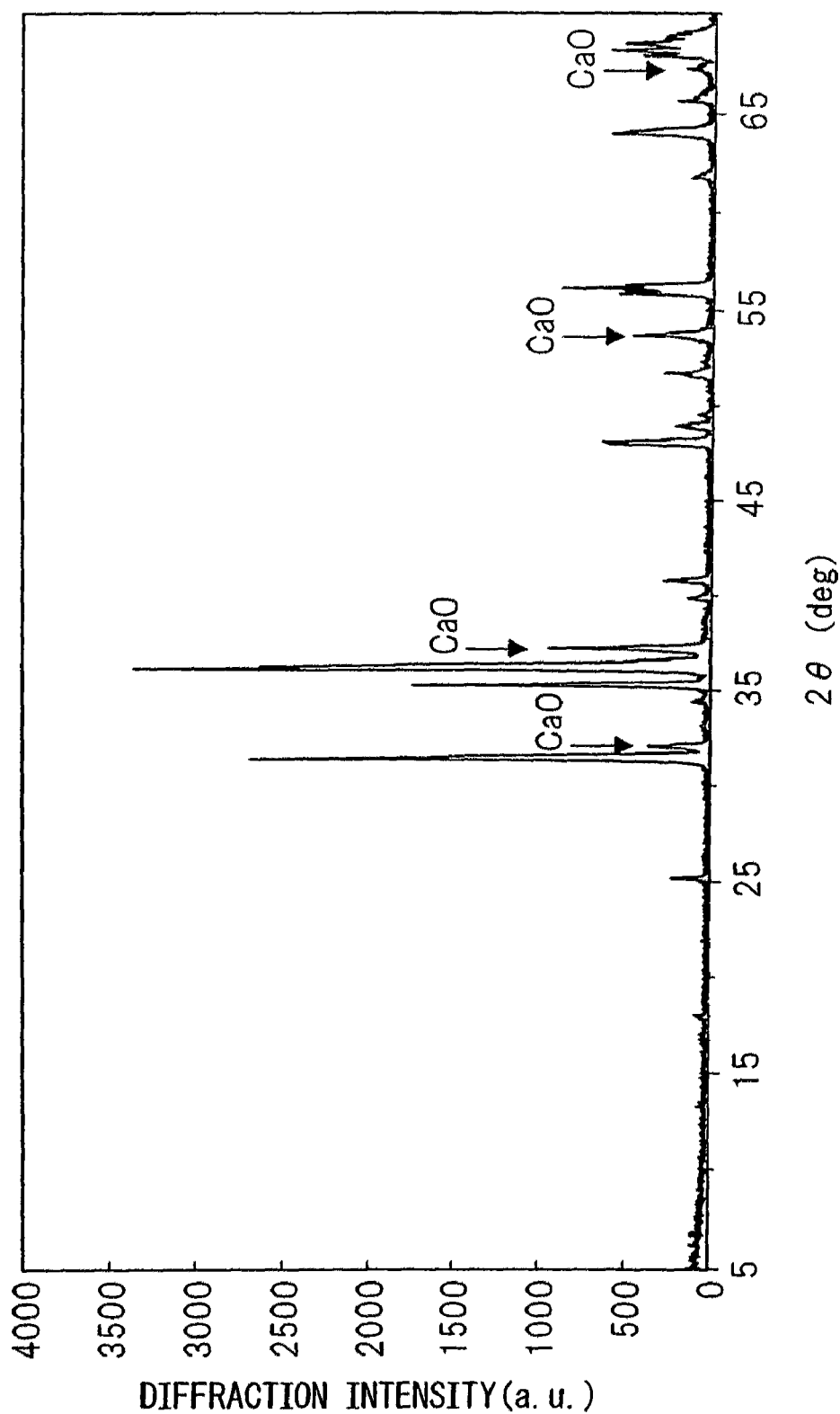
FIG. 2 is an X-ray diffraction pattern of the powder of the fired product obtained in Example 1.

FIG. 2 shows the X-ray diffraction pattern of this powder. As seen from the X-ray pattern, AlN is not present but CaO is remaining (CaO was identified by using Inorganic Crystal Structure Database collection code 75785). In FIG. 2, the peak positions separable as CaO are shown by an arrow. Since the remaining of CaO was recognized in this way, the powder was washed with a 2N-nitric acid solution to remove CaO. FIG. 3 shows the X-ray diffraction pattern of the thus-obtained phosphor powder.

On the other hand, for the purpose of comparison of $CaAlSiN_3$ disclosed in Reference 1 with the crystal of this phosphor, $CaAlSiN_3$ was produced by the method described in Comparative Example 9. The crystal phase produced in Comparative Example 9 was found to be orthorhombic $CaAlSiN_3$ by the identification of X-ray diffraction pattern and confirmed to be the $CaAlSiN_3$ disclosed in Reference 1. FIG. 20 shows this X-ray diffraction pattern.

Next, the red phosphor (FIG. 3) and the orthorhombic $CaAlSiN_3$ (FIG. 20) as the red phosphor of Comparative Example 9 are compared in detail. The X-ray diffraction patterns of FIG. 3 and FIG. 20 are closely similar but greatly differ in small details. For clarifying this, FIG. 4 shows an enlarged X-ray diffraction pattern in the portion where 2θ is from 30° to 42°, and FIG. 5 shows an enlarged diffraction pattern in the portion where 2θ is from 45° to 70°. In the case of the red phosphor, the peak in the vicinity of 31.5° and the peak in the vicinity of 36.3° each is split to allow for appearance of peaks different from orthorhombic $CaAlSiN_3$. FIG. 4 similarly shows a comparison in the portion from 45° to 70°. Also in this portion, the peak in the vicinity of 56.2° is split. Moreover, it is seen that the diffraction pattern over the region from 68° to 69° greatly differs. From these, the red phosphor is considered to be different from the red phosphor of Comparative Example 9 (the same phosphor as that disclosed in Reference 1).

Furthermore, the crystal structure was analyzed based on the X-ray diffraction pattern of FIG. 3. As a result, this crystal phase was found to belong to the monoclinic system. When the lattice constants thereof are a=11.6934, b=9.8697, c=5.7160 and β=117.2630, best coincidence is observed between the calculated peak position and the actually measured peak position. The $CaAlSiN_3$ disclosed in Reference 1 is an orthorhombic system and its lattice constants are reported that a=9.8007, b=5.6497 and c=5.0627. In this way, the crystal phase of the red phosphor differs from the crystal phase reported in Reference 1.

Then, the sample after acid cleaning was subjected to quantitative determination of the metal elements by using an inductively coupled plasma emission spectrometer (ICP-AES) manufactured by SII NanoTechnology Inc., and also to quantitative determination of oxygen and nitrogen by using an oxygen-nitrogen simultaneous analyzer manufactured by LECO, thereby determining weight % of each element. The results obtained are shown in Table 2. For reference, the theoretical weight % of each element of $CaAlSiN_3$ is shown together. The values are closely coincident therebetween and this phosphor is considered to have the compositional ratio of $CaAlSiN_3$. When the above-described discussion on the X-ray diffraction pattern is combined with the results of this composition analysis, it is concluded that this red phosphor is $CaAlSiN_3$ belonging to the monoclinic system.

TABLE 2

|    | Analytical Value (wt %) | Theoretical Value of $CaAlSiN_3$ (wt %) |
|----|---|---|
| Ca | 29.5 | 29.2 |
| Eu | 0.8  | —    |
| Al | 21.4 | 19.7 |
| Si | 19.3 | 20.5 |
| O  | 0.5  | —    |
| N  | 28.5 | 30.6 |

The photoluminescence spectrum and excitation spectrum of the phosphor obtained were measured. In the measurement, a solid quantum efficiency measuring system prepared by combining an integrating sphere with FP6500 manufactured by JASCO Corporation was used. The photoluminescence correction was performed by introducing a substandard light source directly to the integrating sphere. The excitation wavelength used was 450 mm. FIG. 6 shows the results. Emission of red light at 660 nm is confirmed and this red nitride phosphor is verified to be suitable as a red phosphor for a white light-emitting diode using a blue light-emitting diode.

The excitation spectrum at 660 nm was measured. FIG. 7 shows the results. The absorption is confirmed at 460 nm and 340 nm. This phosphor has absorption in the region from ultraviolet to blue and is verified to be usable as a good red phosphor in the region from ultraviolet to blue.

Furthermore, the quantum efficiency was determined by using the above-described apparatus and a quantum efficiency measuring program. The results were evaluated as a relative value to the internal quantum efficiency of the orthorhombic $CaAlSiN_3$ of Comparative Example 9 which is assumed to be 100. The results are shown in Table 3. The quantum efficiency is superior to that of the orthorhombic system, and the red phosphor is found to have excellent properties.

TABLE 3

|  | Internal Quantum Efficiency |
|---|---|
| Example 1 | 109 |
| Example 2 | 115 |
| Example 3 | 103 |
| Comparative Example 9 | 100 |
| Example 5 | 117 |

Example 2

Figure 8:
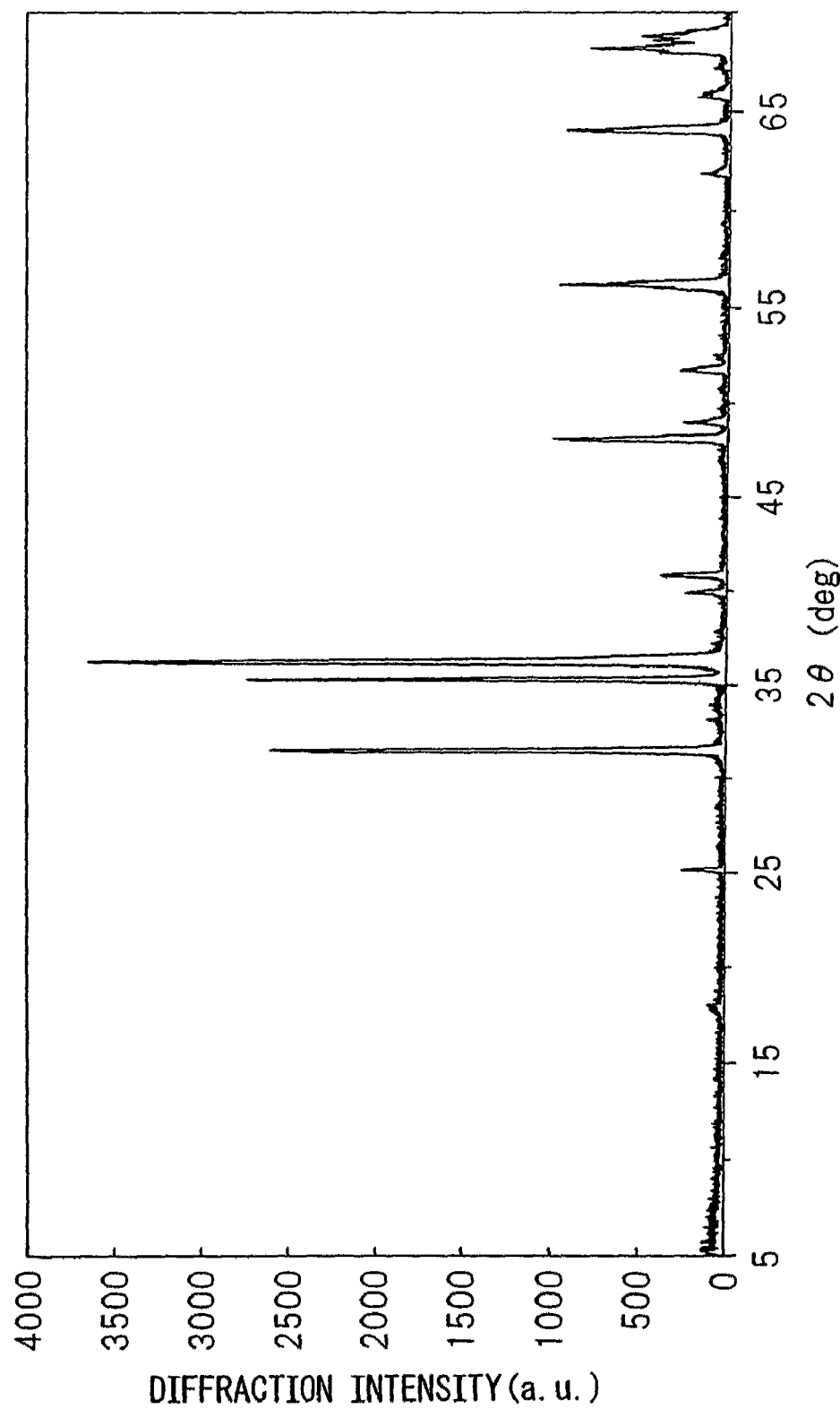
FIG. 8 is an X-ray diffraction pattern of the powder of the fired product obtained in Example 2.
Figure 9:
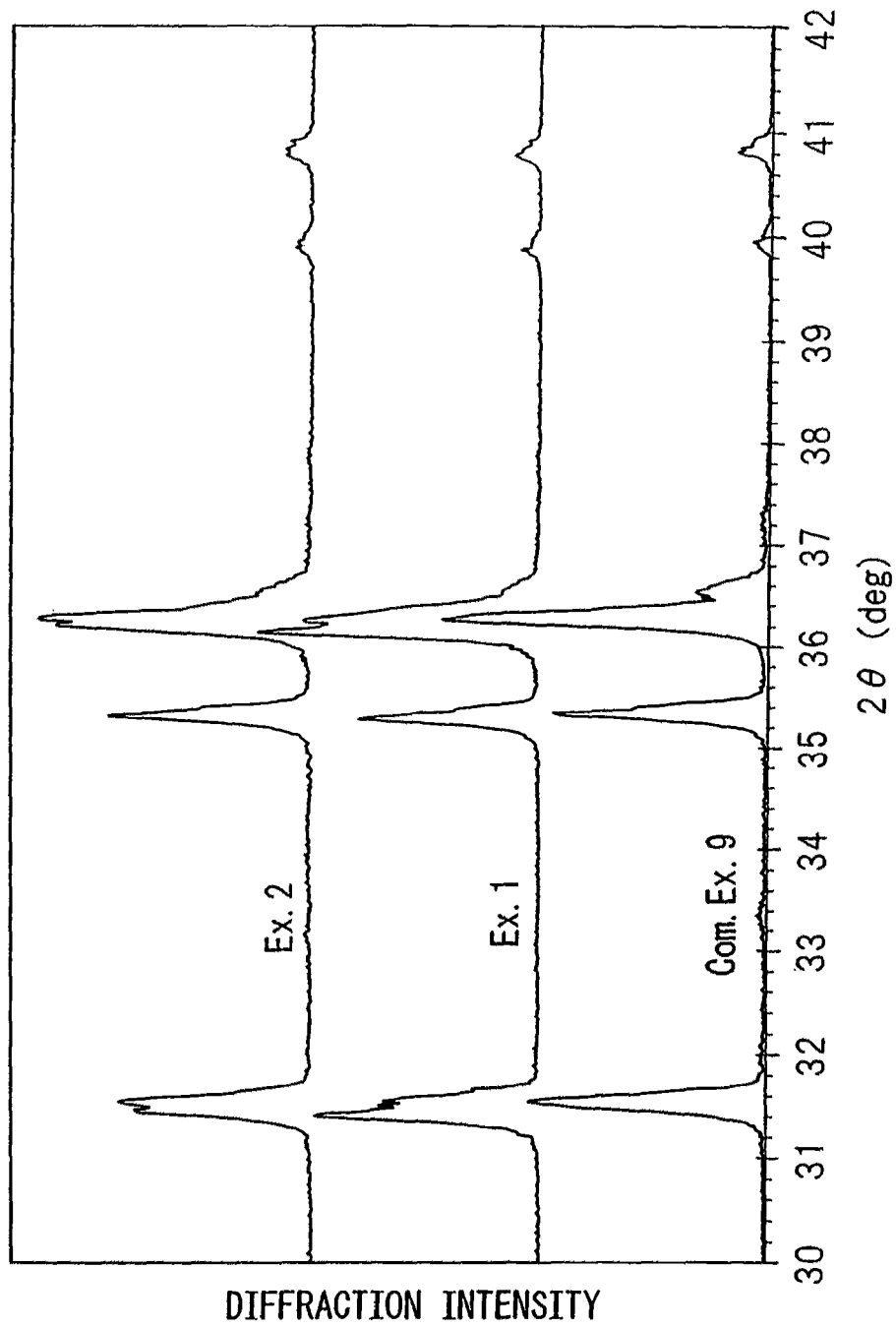
FIG. 9 is a comparison of X-ray diffraction patterns of the powders of Example 2, Example 1 and Comparative Example 9.
Figure 10:
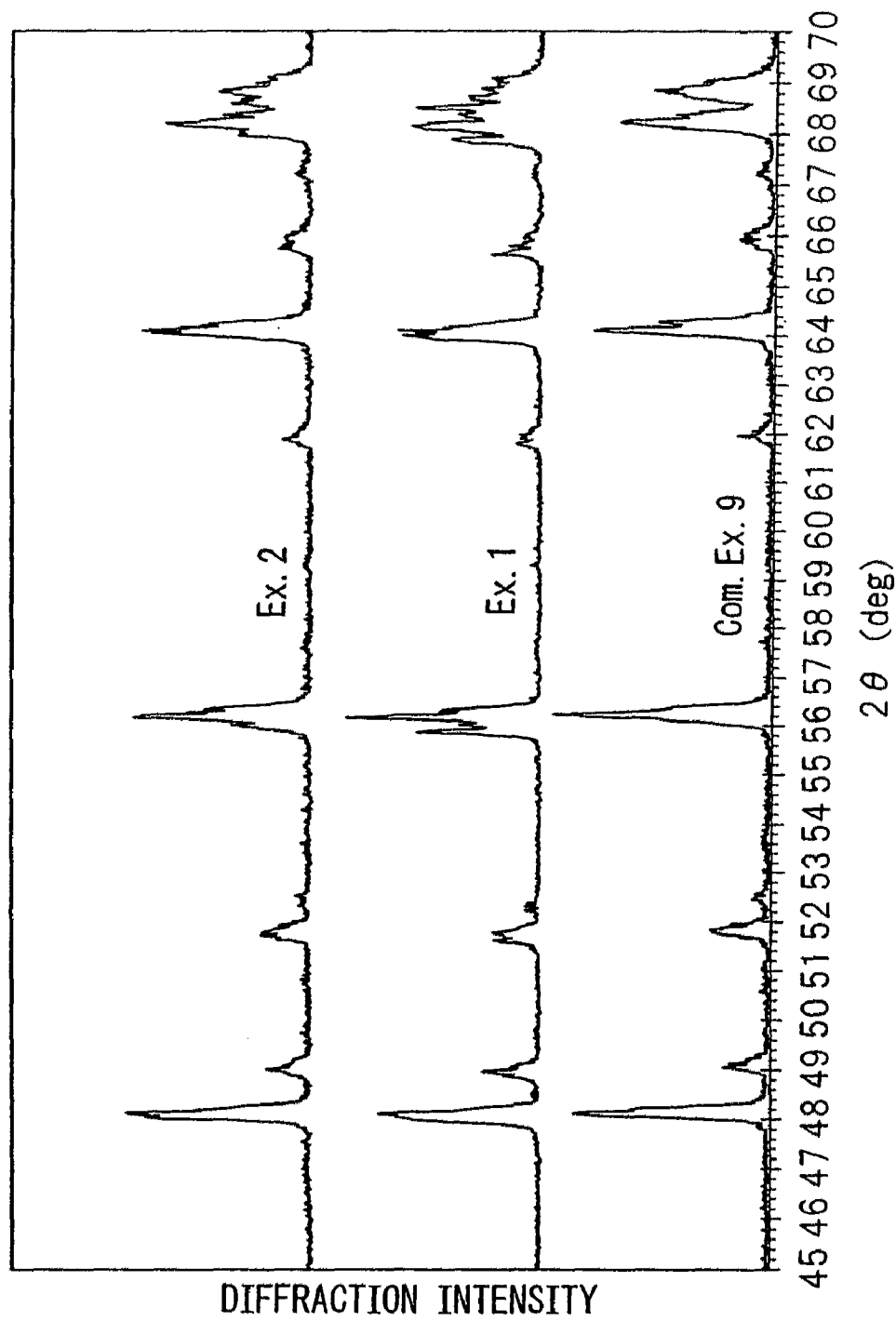
FIG. 10 is a comparison of X-ray diffraction patterns of the powders of Example 2, Example 1 and Comparative Example 9.

The same raw materials as in Example 1 were prepared, and these raw materials were weighed in a nitrogen box at a ratio of $Ca_3N_2$:$AlN$:$Si_3N_4$=20.0:60.0:20.0 (mol %), and 1.5 parts by weight as Eu of EuN was further added to 100 parts by weight of the raw materials obtained at the above-described ratio. The resulting mixture was fired by the same method as in Example 1 to obtain a red phosphor. FIG. 8 shows the X-ray diffraction pattern of this powder. Similarly to Example 1, FIG. 9 shows an enlarged view of the portion where 2θ is from 30° to 42°. Here, for the purpose of comparison, this red phosphor is compared with Comparative Example 9 (orthorhombic $CaAlSiN_3$) and Example 1 (monoclinic $CaAlSiN_3$). From the comparison, the red phosphor of this Example is found to be a crystal analogous to that of Example 1 and be a monoclinic system. FIG. 10 similarly shows a comparison in the portion where 2θ s fis from 45° to 70°. Also in this portion, the crystal constituting the phosphor of this Example is confirmed to be analogous to the crystal of Example 1 and found to be monoclinic $CaAlSiN_3$.

The photoluminescence spectrum and excitation spectrum of this phosphor were measured by the same method as in Example 1, as a result, the photoluminescence spectrum and excitation spectrum were found to have peaks almost at the same wavelengths as in Example 1. Furthermore, the internal quantum efficiency was determined. The results are shown in Table 3. This red phosphor exhibits more excellent internal quantum efficiency than that of orthorhombic $CaAlSiN_3$.

Example 3

Figure 11:
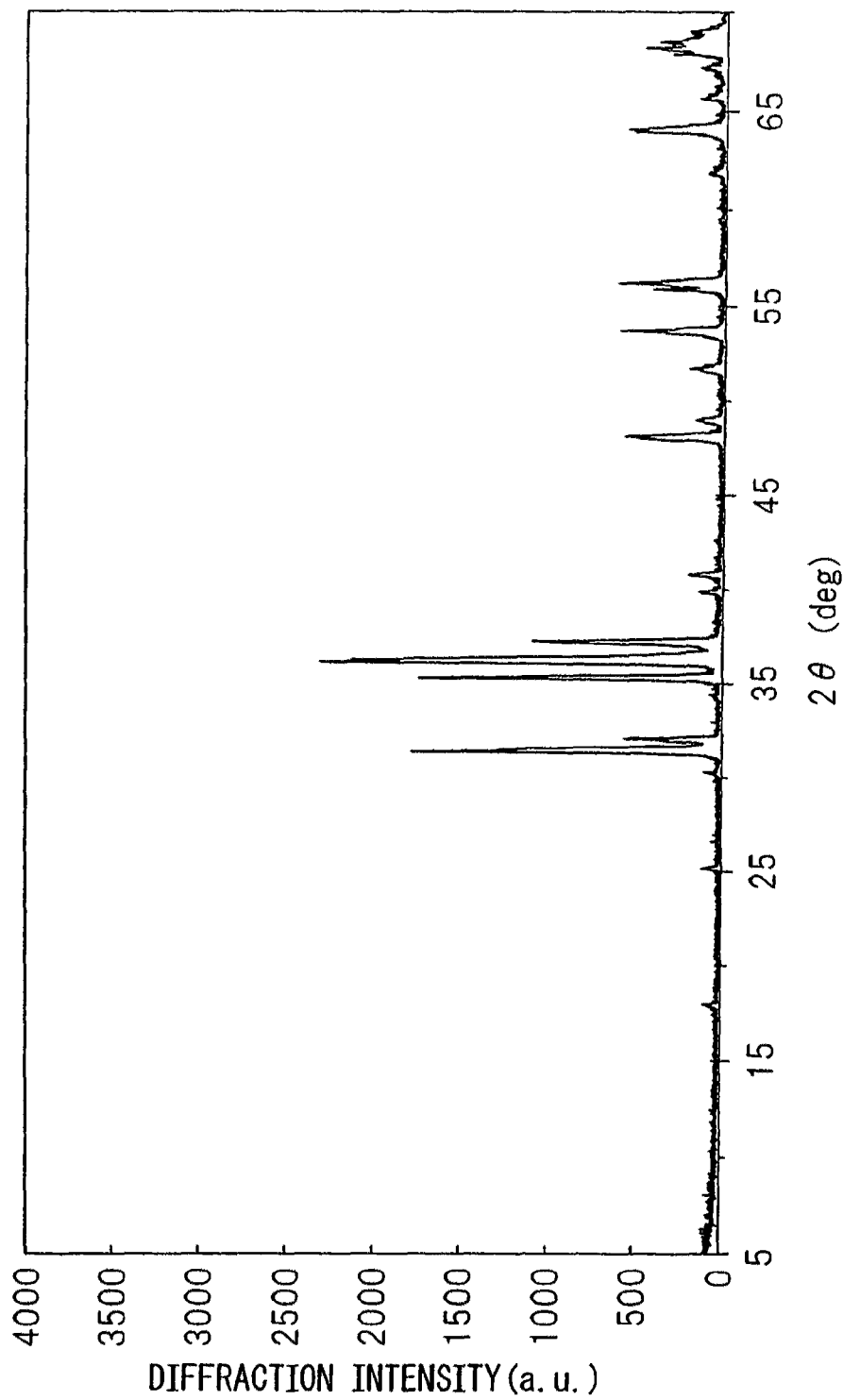
FIG. 11 is an X-ray diffraction pattern of the powder of the fired product obtained in Example 3.

The same raw materials as in Example 1 were prepared, and these raw materials were weighed in a nitrogen box at a ratio of $Ca_3N_2$:AlN:$Si_3N_4$=60.0:30.0:10.0 (mol %), and 1.5 parts by weight as Eu of EuN was further added to 100 parts by weight of the raw materials obtained at the above-described ratio. The resulting mixture was fired by the same method as in Example 1 to obtain a red phosphor. FIG. 11 shows the X-ray diffraction pattern of this powder. Remaining of CaO is significant, but the X-ray diffraction pattern excluding CaO is the same as that of Example 1 and this red phosphor is found to be monoclinic $CaAlSiN_3$. Since this red phosphor was containing CaO, acid cleaning was performed in the same manner as in Example 1 to remove CaO. The photoluminescence spectrum and excitation spectrum were measured by the same method as in Example 1, as a result, the photoluminescence spectrum and excitation spectrum were almost the same as those in Example 1. Furthermore, the internal quantum efficiency was determined by the same method as in Example 1. This red phosphor was also a red phosphor more excellent than orthorhombic $CaAlSiN_3$.

Comparative Example 1

Figure 12:
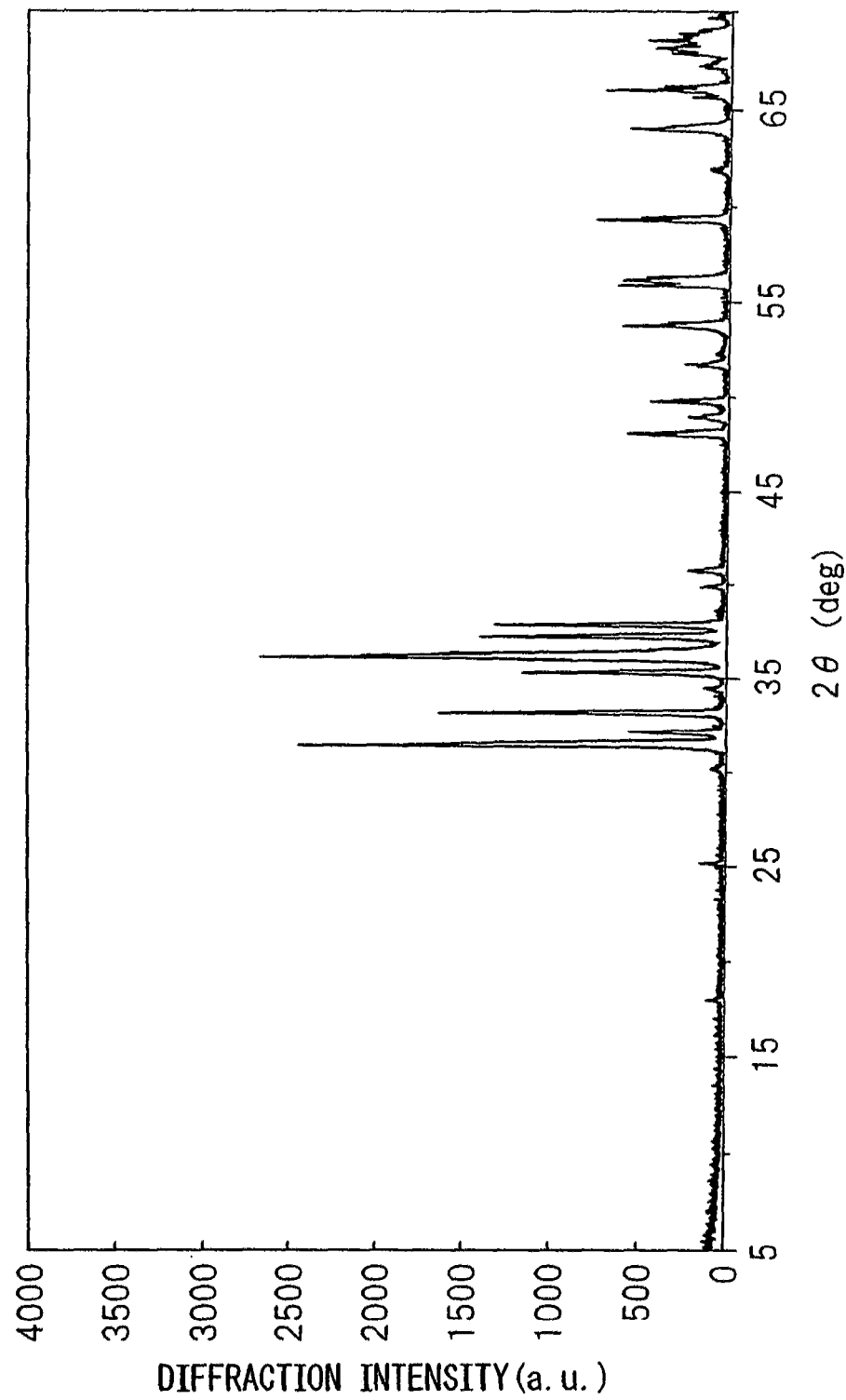
FIG. 12 is an X-ray diffraction pattern of the powder of the fired product obtained in Comparative Example 1.

A phosphor powder having a composition shown in Table 1 was produced by the same method as in Example 1. FIG. 12 shows the X-ray diffraction pattern. As seen from the analysis of this X-ray diffraction pattern, the crystal of the red phosphor in Example 1, CaO and AlN are present in this powder. When this powder was cleaned with 2N-nitric acid in the same manner as in Example 1, CaO could be removed but AlN could not be removed. The photoluminescence spectrum was measured, as a result, almost the same photoluminescence wavelength as in Example 1 was exhibited. The light emission intensity was about 50% of that in Example 1.

Comparative Example 2

Figure 13:
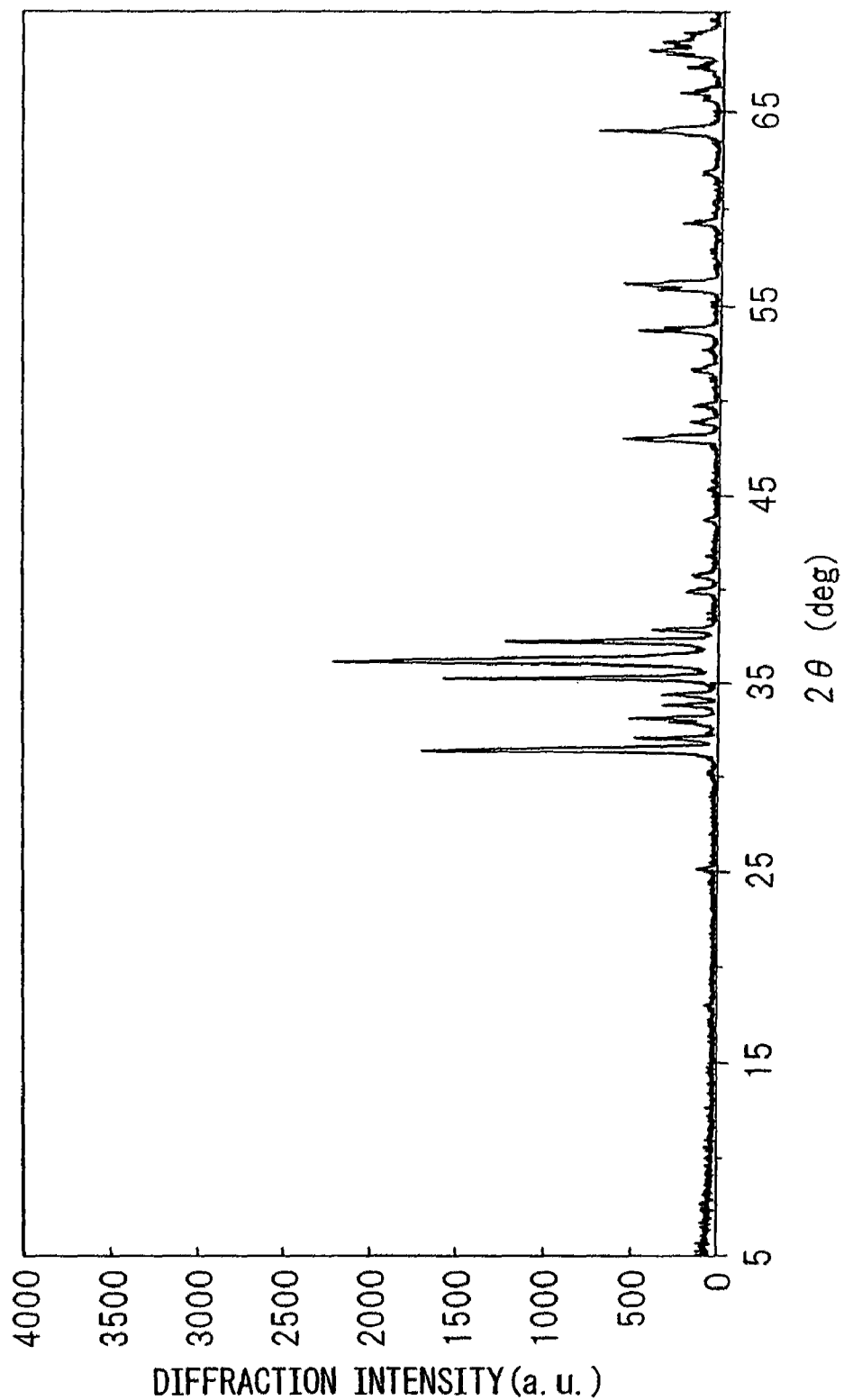
FIG. 13 is an X-ray diffraction pattern of the powder of the fired product obtained in Comparative Example 2.

A phosphor powder having a composition shown in Table 1 was produced by the same method as in Example 1. FIG. 13 shows the X-ray diffraction pattern. As seen from the analysis of this X-ray diffraction pattern, the crystal of the red phosphor in Example 1, CaO and another crystal phase are present in this powder. The photoluminescence spectrum was measured, as a result, almost the same photoluminescence wavelength as in Example 1 was exhibited. The light emission intensity was about 61% of that in Example 1.

Comparative Example 3

Figure 14:
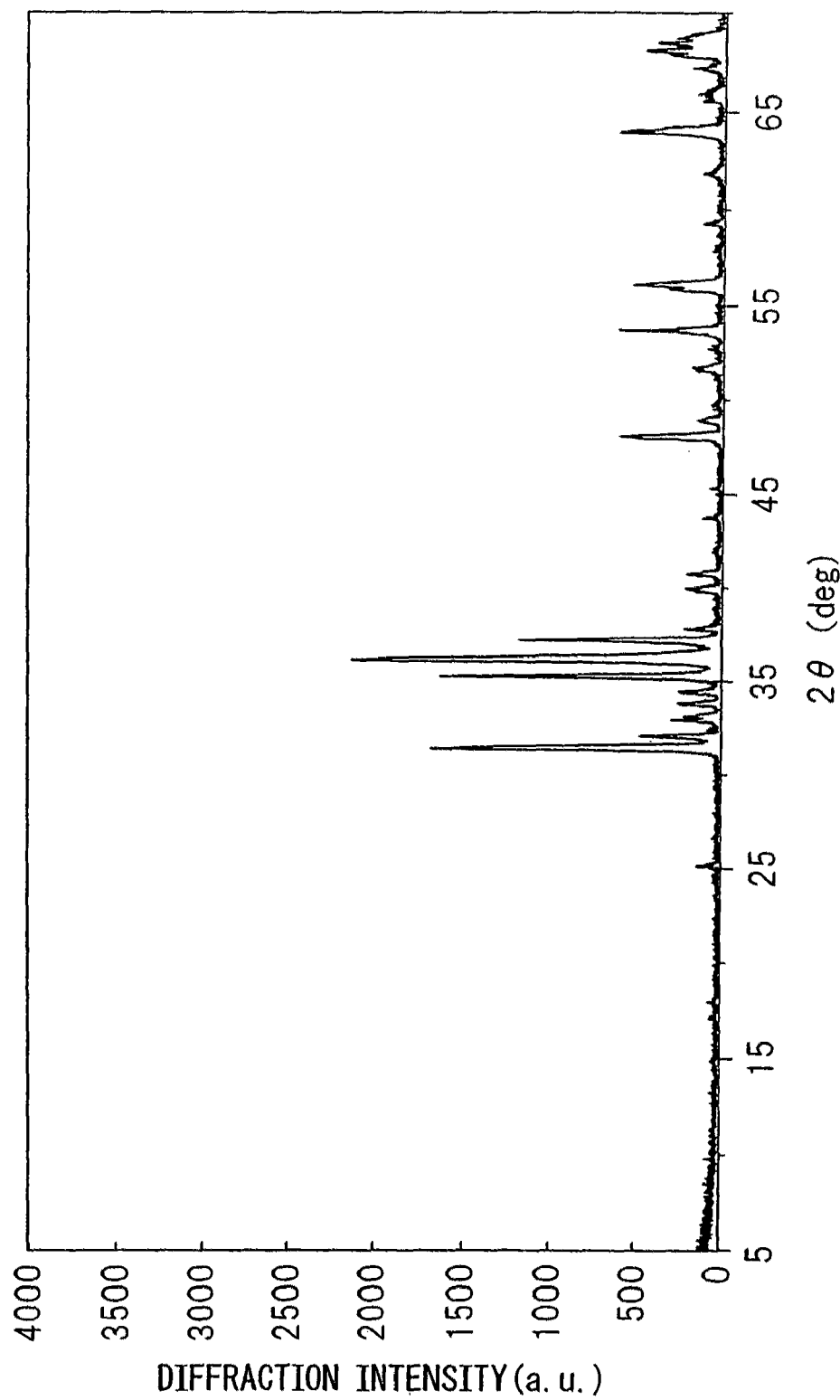
FIG. 14 is an X-ray diffraction pattern of the powder of the fired product obtained in Comparative Example 3.

A phosphor powder having a composition shown in Table 1 was produced by the same method as in Example 1. FIG. 14 shows the X-ray diffraction pattern. The phosphor produced to have this composition was constituted by almost the same crystal phase as in Comparative Example 2. The photoluminescence spectrum was measured, as a result, almost the same photoluminescence wavelength as in Example 1 was exhibited. The light emission intensity was about 68% of that in Example 1.

Comparative Example 4

Figure 15:
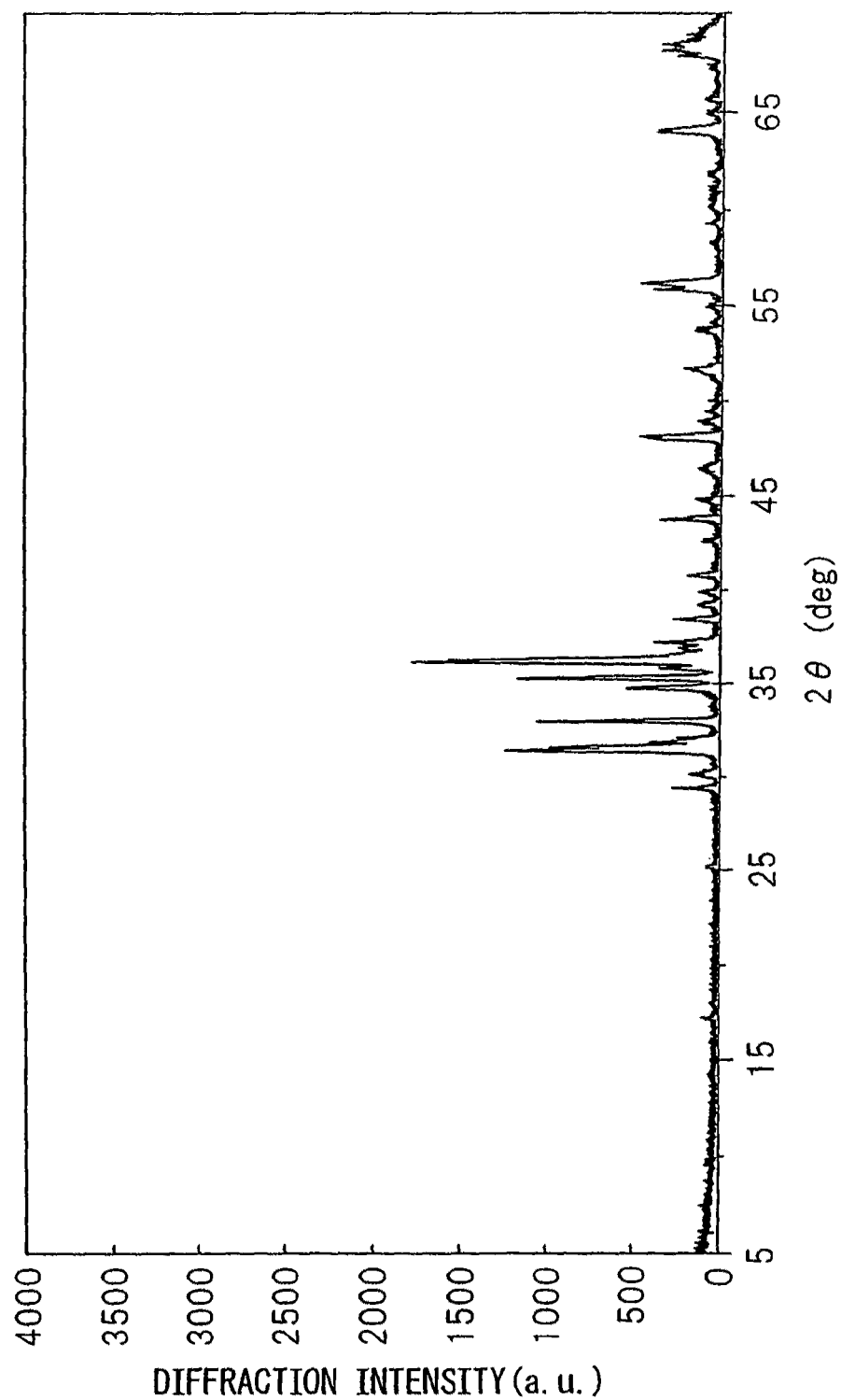
FIG. 15 is an X-ray diffraction pattern of the powder of the fired product obtained in Comparative Example 4.

A phosphor powder having a composition shown in Table 1 was produced by the same method as in Example 1. FIG. 15 shows the X-ray diffraction pattern. As seen from the analysis of this X-ray diffraction pattern, the crystal of the red phosphor in Example 1, CaO and another crystal phase are present in this powder. The photoluminescence spectrum was measured, as a result, almost the same photoluminescence wavelength as in Example 1 was exhibited. The light emission intensity was about 62% of that in Example 1.

Comparative Example 5

Figure 16:
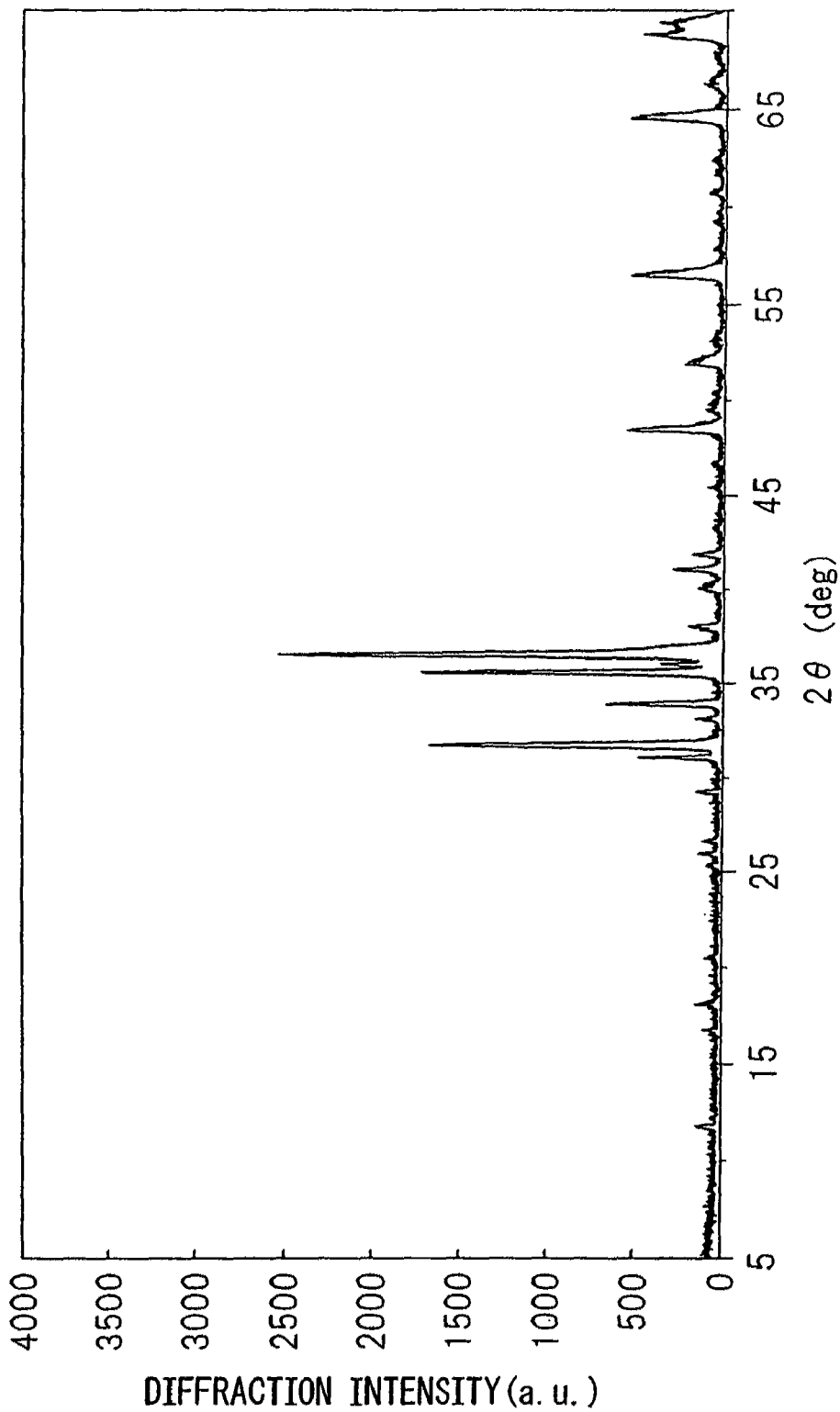
FIG. 16 is an X-ray diffraction pattern of the powder of the fired product obtained in Comparative Example 5.

A phosphor powder having a composition shown in Table 1 was produced by the same method as in Example 1. FIG. 16 shows the X-ray diffraction pattern. As seen from the analysis of this X-ray diffraction pattern, the crystal phase of orthorhombic $CaAlSiN_3$ in Comparative Example 9 (differing in the lattice constant) and an unidentifiable crystal phase are present in this powder. Also, a very slight amount of AlN is present. The photoluminescence spectrum was measured, as a result, the photoluminescence wavelength was 650 nm and more shifted to yellow than in Example 1. The light emission intensity was about 66% of that in Example 1.

Comparative Example 6

Figure 17:
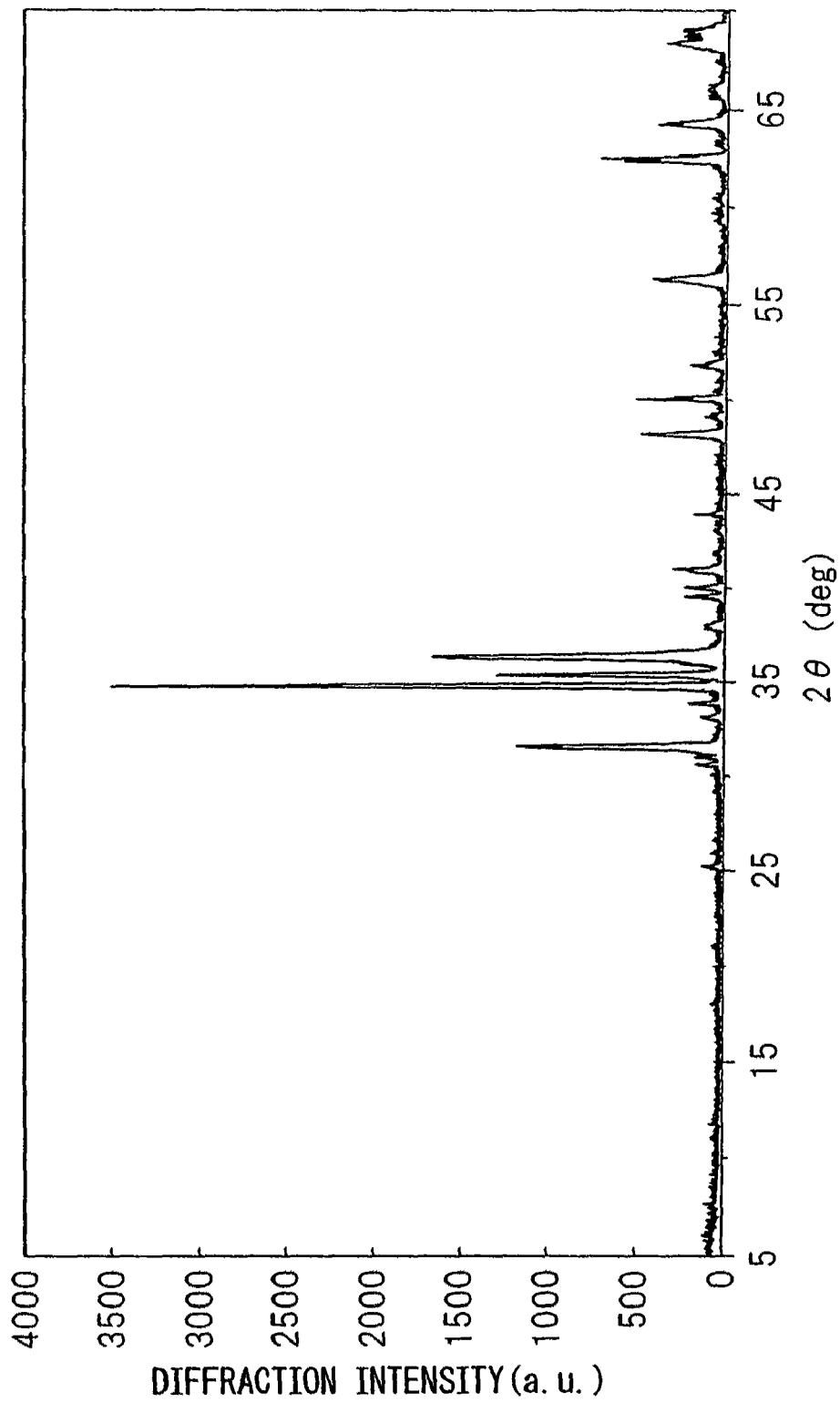
FIG. 17 is an X-ray diffraction pattern of the powder of the fired product obtained in Comparative Example 6.

A phosphor powder having a composition shown in Table 1 was produced by the same method as in Example 1. FIG. 17 shows the X-ray diffraction pattern. As seen from the analysis of this X-ray diffraction pattern, the crystal phase of orthorhombic $CaAlSiN_3$ in Comparative Example 9 (differing in the lattice constant) and an unidentifiable crystal phase are present in this powder. The photoluminescence wavelength was 645 nm and more shifted to yellow than in Example 1. The light emission intensity was about 50% of that in Example 1.

Comparative Example 7

Figure 18:
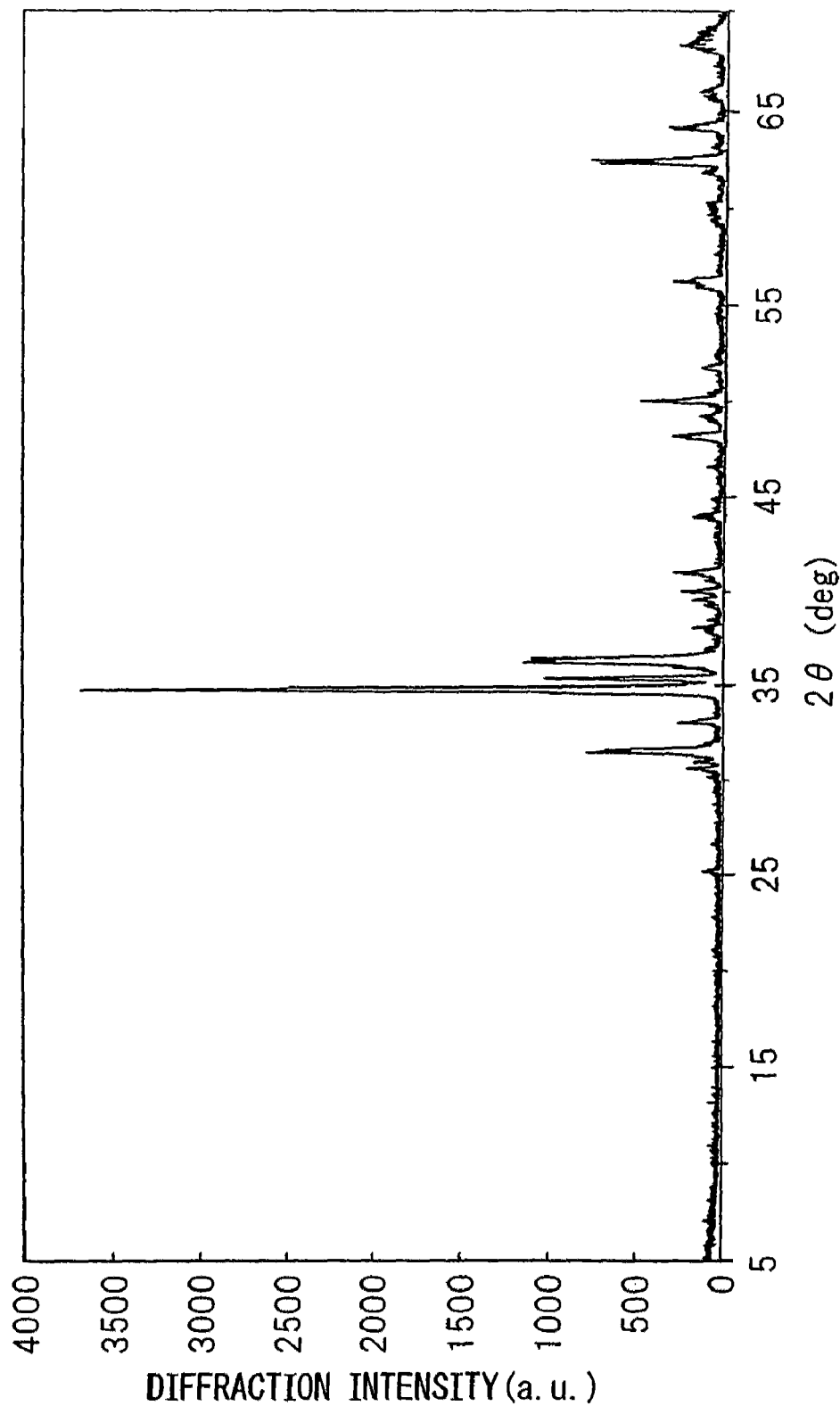
FIG. 18 is an X-ray diffraction pattern of the powder of the fired product obtained in Comparative Example 7.

A phosphor powder having a composition shown in Table 1 was produced by the same method as in Example 1. FIG. 18 shows the X-ray diffraction pattern. As seen from the analysis of this X-ray diffraction pattern, the intensity of X-ray diffraction is decreased and in this composition region, a good crystal can be hardly obtained. Therefore, identification of the crystal phase was not performed. The photoluminescence wavelength was 645 nm and more shifted to yellow than in Example 1. The light emission intensity was about 41% of that in Example 1.

Comparative Example 8

Figure 19:
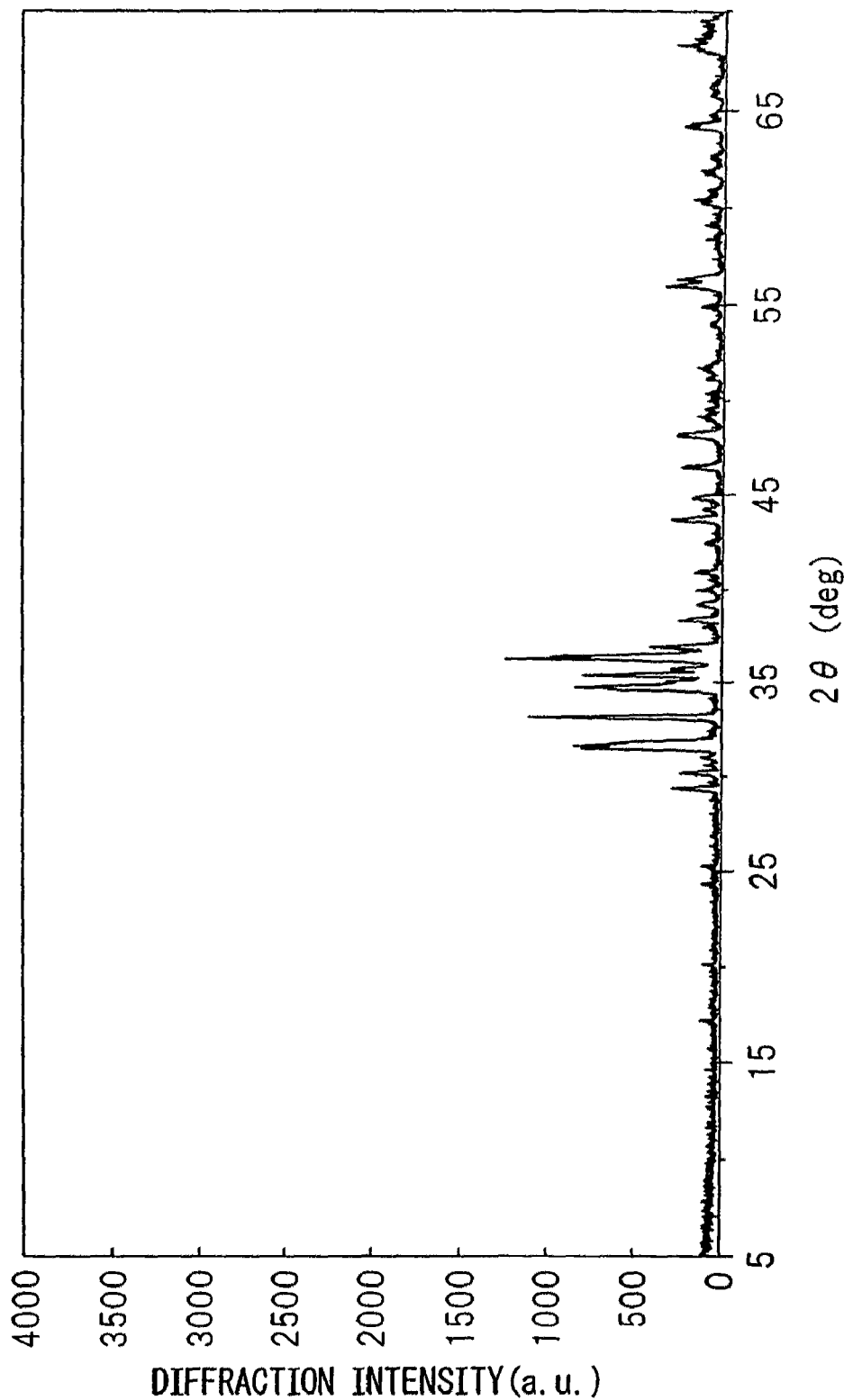
FIG. 19 is an X-ray diffraction pattern of the powder of the fired product obtained in Comparative Example 8.

A phosphor powder having a composition shown in Table 1 was produced by the same method as in Example 1. FIG. 19 shows the X-ray diffraction pattern. As seen from the analysis of this X-ray diffraction pattern, a crystal phase analogous to that in Example 1 is contained in this powder, but the diffraction intensity is wholly low and a good crystal cannot be obtained. The photoluminescence wavelength was measured, as a result, almost the same photoluminescence wavelength was exhibited. However, the light emission intensity was about 72% of that in Example 1.

Comparative Example 9

In the composition shown in Table 1, crystalline $Si_3N_4$ was used as the raw material in place of amorphous $Si_3N_4$. The surface area of the crystalline $Si_3N_4$ was about 10 $m^2$/g. Other raw materials were the same as those in Example 1, and the firing was also performed by the same method as in Example 1. FIG. 20 shows the X-ray diffraction pattern. When this X-ray diffraction pattern and the orthorhombic $CaAlSiN_3$ (lattice constants: a=9.8007, b=5.6497, c=5.0627) were compared, very good coincidence was obtained. The internal quantum efficiency was determined by the same method as in Example 1.

Example 4

FIG. 21A shows the scanning electron micrograph (hereinafter referred to as an "SEM photograph") of the phosphor powder prepared in Example 2. For the purpose of comparison, FIG. 21B shows a photograph of the particle form when crystalline silicon nitride was used. In the case of $CaAlSiN_3$ using crystalline silicon nitride of FIG. 21B, primary particles are contacted at faces and aggregated to form a secondary particle of about 10 μm, whereas in the case of using amorphous silicon nitride as the raw material of FIG. 21A, a large secondary particle resulting from contact at faces and dense aggregation of primary particles is not observed. On viewing in detail, a strongly aggregated particle as in FIG. 21B is observed also in FIG. 21A, but the size thereof is by far smaller than that in FIG. 21B. Also, it is seen that in the case of $CaAlSiN_3$ produced by using amorphous silicon nitride, individual particles are taking an enhedral form. This suggests that the $CaAlSiN_3$ crystal is grown in a spatially isolated site, ensuring that the intended uniform formation of a crystal nucleus in the spatially distant state can be realized.

Figure 22:
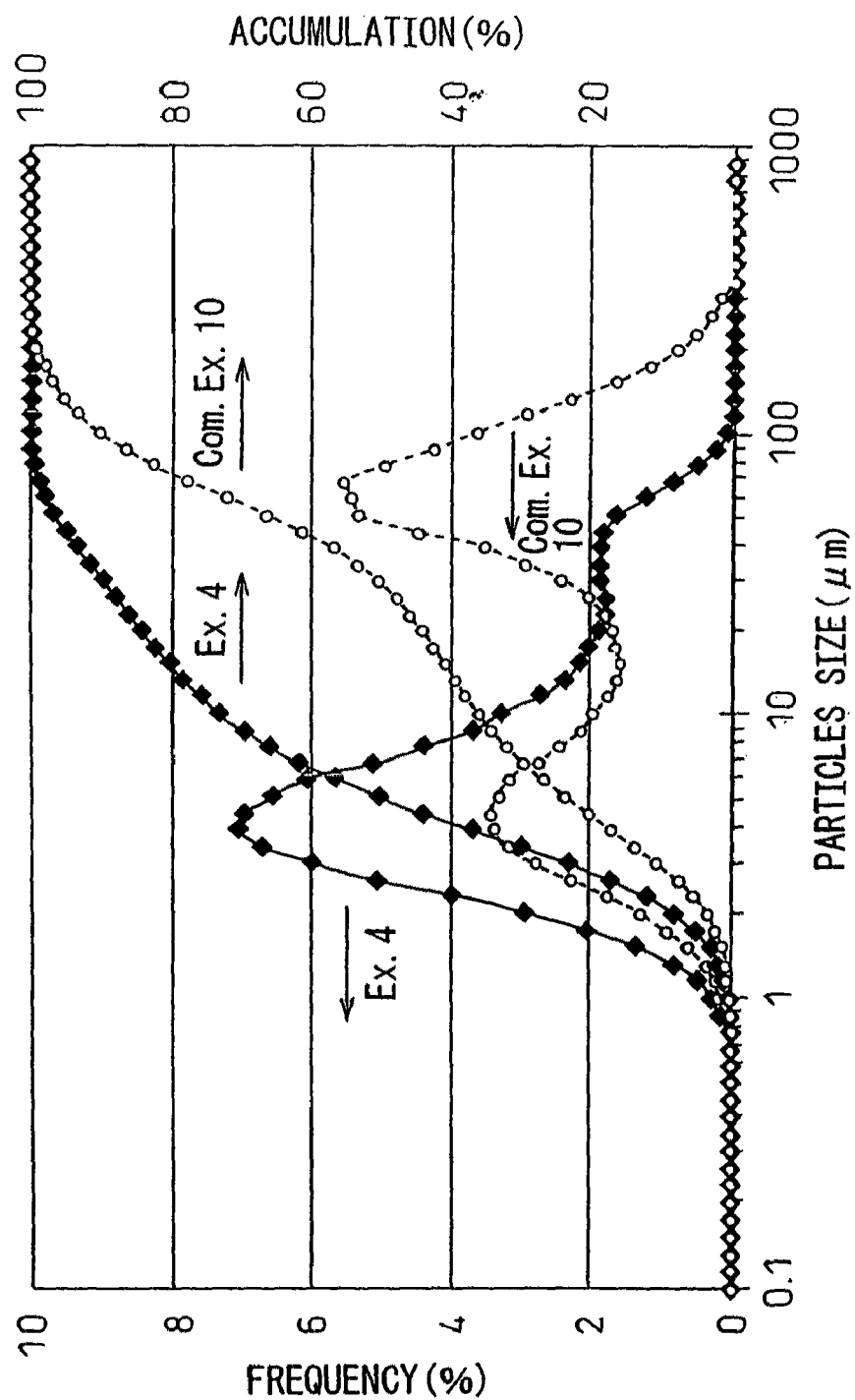
FIG. 22 shows the particle size distributions of the particles in Example 4 and Comparative Example 10.

Next, the particle size distribution showing aggregation of the entire powder was measured. In the measurement, a laser diffraction/scattering type particle size distribution measuring apparatus, LA-910, manufactured by Horiba Ltd. was used. In order to exclude weak aggregation of the powder due to moisture or the like, ultrasonic dispersion was performed for 2 minutes before the measurement. FIG. 22 shows the measurement results. In the case of using amorphous silicon nitride in Example 2, the $CaAlSiN_3$ particle exhibits high frequency of an aggregate of about 4 μm, whereas in the powder using crystalline silicon nitride produced in Comparative Example 10, the frequency of a huge aggregate particle of about 60 μm is high. It is seen that when amorphous silicon nitride is used, formation of a huge particle resulting from further aggregation of secondary particles is effectively avoided. The average particle diameters obtained by the measurement are shown together in Table 4. When amorphous silicon nitride is used, a powder having an average particle diameter of 10 μm or less can be obtained without performing pulverization.

TABLE 4

| | Form of Silicon Nitride | Average Particle Diameter (μm) |
|---|---|---|
| Example 4 | amorphous silicon nitride | 5.0 |
| Comparative Example 10 | crystalline silicon nitride | 29.3 |
| Comparative Example 11 | crystalline silicon nitride | 22.5 |

Figure 23:
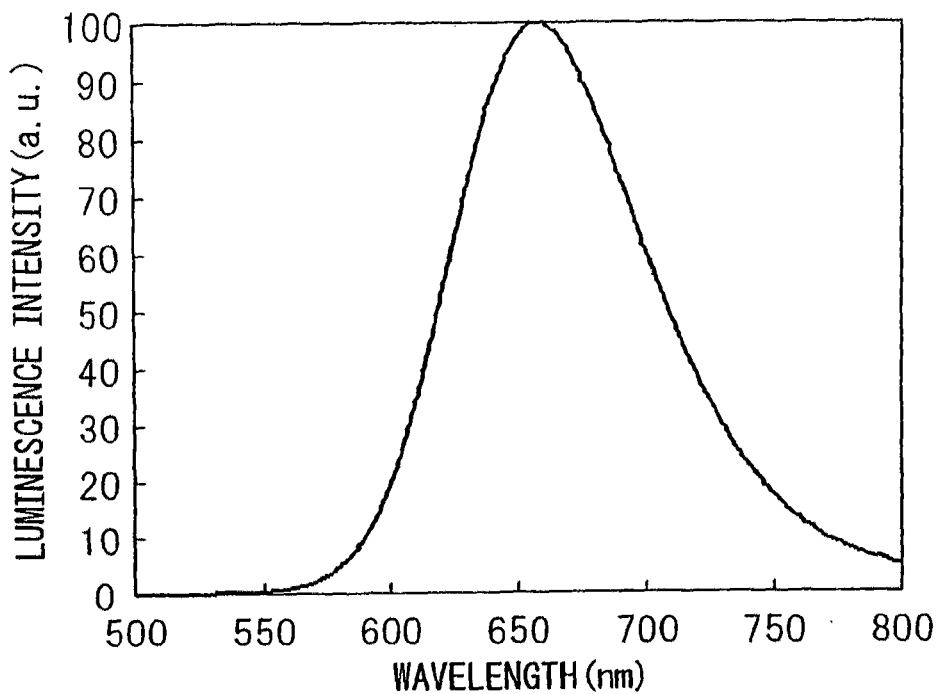
FIG. 23 is a photoluminescence spectrum of the particle of Example 4.

Then, the photoluminescence spectrum of the obtained phosphor was measured by setting the excitation wavelength to 450 nm. The measuring apparatus used was FP6500 with an integrating sphere manufactured by JASCO Corporation, and the measured spectrum was corrected by using a substandard light source. FIG. 23 shows the results. Emission of red light at 658 nm is confirmed and this red nitride phosphor is verified to be suitable as a red phosphor for adjusting the color tone of a white light-emitting diode using a blue light-emitting diode.

Figure 24:
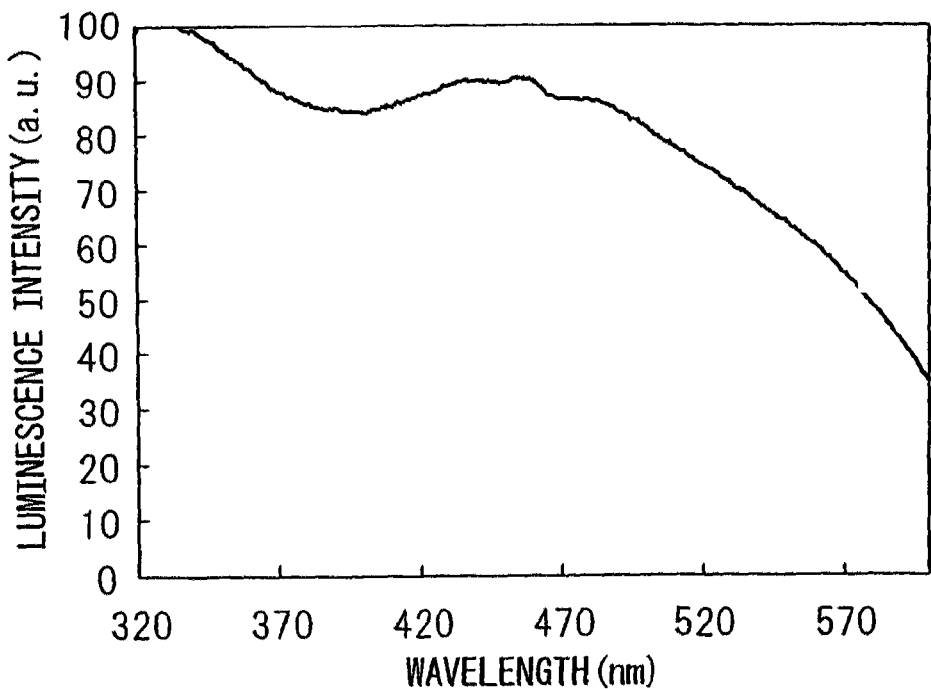
FIG. 24 is an excitation spectrum of the particle of Example 4.

Furthermore, the excitation spectrum at 657 nm was measured. FIG. 24 shows the results. The absorption is confirmed at 450 nm and 320 nm. This phosphor has absorption in the region from ultraviolet to blue and is verified to be usable as a good red phosphor in the region from ultraviolet to blue.

Comparative Example 10

Comparative Example 9 was repeated. That is, a phosphor was produced by the same method as in Example 4 except for using crystalline silicon nitride as the silicon nitride raw material. The specific surface area of the crystalline silicon nitride used was about 10 $m^2$/g, and the oxygen content was 1.3 wt %.

FIG. 21B shows the SEM photograph of the obtained powder $CaAlSiN_3$ particle. For clearly showing the fundamental structure of the particle, small particles in the powder of Comparative Example 10 are selected. In practice, a particle larger than the particle shown in the photograph is predominating. This large particle is present in such a manner that particles as shown in FIG. 21B are further connected to form a large particle.

Then, the photoluminescence spectrum and excitation spectrum were measured by the same method as in Example 4, as a result, the peak positions was equal to those in Example 4 but the photoluminescence intensity was lower than that of Example 4. Furthermore, in order to clarify the particle size of the entire powder, the particle size distribution was measured by the same method as in Example 4. At the measurement of the particle size distribution, since a large number of relatively firmly sintered lumps of about hundreds of μm were present in the $CaAlSiN_3$ produced by using crystalline silicon nitride, the lumps were crushed by using an agate mortar to remove the lumps. FIG. 22 shows the measurement results. The average particle diameter was 29.3 μm. As seen from the results of measurement, a large number of particles of 60 μm or more are present in the phosphor powder of Comparative Example 10, and such a huge particle is unsuitable as the phosphor powder for a white light-emitting diode. In order to use this powder as the phosphor for a white light-emitting diode, the powder needs to be pulverized. Therefore, 10 g of the powder and zirconia ball of 5 mmϕ were charged into a 250 ml-volume vessel, and the pulverization was performed by a vibration mill for 30 minutes. The powder was separated from the ball, and the particle size distribution of the powder was measured by the same method as in Example 4. As a result, the average particle diameter became 2.0 μm. When the particle form was observed through a scanning electron microscope, a large particle was not observed, but many fine particle scraps peculiar to a pulverized powder were present. At this time, the light emission intensity (excitation wavelength: 450 nm) was decreased to 65% based on the intensity before pulverization. In this way, when a phosphor powder is produced by using crystalline silicon nitride as the raw material, a large particle needs to be removed by performing pulverization and when the powder is pulverized, the light emission intensity is decreased and the performance as a phosphor is deteriorated.

Comparative Example 11

A phosphor was produced by the same method as in Comparative Example 10 except that crystalline silicon nitride with less oxygen was used as the silicon nitride raw material. The surface area of the crystalline silicon nitride used was about 3 $m^2/g$, and the oxygen content was 0.9 wt %. When the silicon nitride powder of this Comparative Example was used, the bulk density of the raw material powder became larger that that in Comparative Example 10, and a powder having a low bulk was obtained. The average particle diameter of the obtained powder is shown in Table 4. Similarly to Comparative Example 10, a large aggregate particle was formed. The photoluminescence spectrum and excitation spectrum were slightly lower than those in Example 2. For using this powder as the phosphor for a white light-emitting diode, similarly to Comparative Example 10, the powder needs to be pulverized.

Example 5

A phosphor was prepared by the same method as in Example 2 except that the amount of added EuN was changed to 2.5% by weight as Eu. The photoluminescence wavelength of the obtained phosphor was shifted to a longer side in comparison with Example 2 to 666 nm. The quantum efficiency of the phosphor was then measured by the same method as in Example 2 and the results are shown in Table 3.

Comparative Example 12

A phosphor was prepared by the same method as in Example 2 except that the amount of added EuN was changed to 11% by weight as Eu. The photoluminescence spectrum was measured by the same method as in Example 2. The photoluminescence wavelength of the obtained phosphor was shifted to 694 nm. The light emission intensity was about 50% of that in Example 2.

INDUSTRIAL APPLICABILITY

A novel high-efficiency red nitride phosphor capable of absorbing blue light and emitting red photoluminescence is provided. Also, the red nitride phosphor contains almost no residual AlN phase and therefore, is free of unnecessary light emission. In addition, since the red phosphor does not contain a coarse particle even without performing pulverizing, this is a red phosphor capable of preventing reduction of the light emission efficiency due to pulverization and assured of high light emission efficiency. Furthermore, by combining the red nitride phosphor and a light-emitting element such as light-emitting diode, a light-emitting device excellent in the color tone can be provided.

The invention claimed is:

1. A method for producing Eu-activated $CaAlSiN_3$ powder, comprising firing a mixture of $Ca_3N_2$, AlN, $Si_3N_4$ and EuN raw material powder at 1,400 to 2,000° C. in a nitrogen-containing atmosphere, the $Ca_3N_2$, AlN and $Si_3N_4$ raw material powders giving a composition represented by $xCa_3N_2 \cdot yAlN \cdot zSi_3N_4$, wherein $x+y+z=100$, $10 \leq x \leq 70$ and $y:z=(72:28)$ to $(78:22)$, and the EuN being contained in an amount of 0.01 to 10 parts by weight as Eu per 100 parts by weight in total of the $Ca_3N_2$, AlN and $Si_3N_4$, wherein an amorphous $Si_3N_4$ or a nitrogen-containing silane compound is used as the $Si_3N_4$ raw material powder.

2. A red phosphor powder of Eu-activated $CaAlSiN_3$ having an average particle diameter of 10 μm or less as measured in the non-pulverized state by laser scattering particle size distribution analysis and which is obtained by the method according to claim 1.

3. A light-emitting device comprising a light-emitting element, a yellow phosphor, and the red phosphor claimed in claim 2.

4. The light-emitting device as claimed in claim 3, wherein the light-emitting element is a blue light-emitting diode.

5. The light-emitting apparatus as claimed in claim 4, wherein said red phosphor converts the blue light emitted from said blue light-emitting element into red light.

6. The method as claimed in claim 1, wherein the firing is performed at 1,600 to 2,000° C. in a pressurized nitrogen atmosphere.

7. The method as claimed in claim 1, wherein $Ca_3N_2$ occupies from 20 to 40 mol % in 100 mol % in total of the $Ca_3N_2$, AlN and $Si_3N_4$.

8. The method as claimed in claim 1, wherein the molar ratio of AlN and $Si_3N_4$ is about 3:1.

9. The method as claimed in claim 1, which uses a raw material powder comprising EuN partially substituted by $Eu_2O_3$.

10. The method as claimed in claim 1, wherein the nitrogen-containing atmosphere is a nitrogen atmosphere.

11. The method as claimed in claim 1, wherein the Eu-activated $CaAlSiN_3$ crystal after firing is further acid-cleaned to remove an oxide covering the Eu-activated $CaAlSiN_3$ crystal powder.

12. The method as claimed in claim 1, wherein the Eu-activated $CaAlSiN_3$ is a red phosphor.

13. The method as claimed in claim 1, wherein amorphous $Si_3N_4$ is used as the $Si_3N_4$ raw material powder.

* * * * *